United States Patent
Jones

(10) Patent No.: US 7,480,856 B2
(45) Date of Patent: Jan. 20, 2009

(54) SYSTEM AND METHOD FOR TRANSFORMATION OF XML DOCUMENTS USING STYLESHEETS

(75) Inventor: Kevin J. Jones, Harrogate (GB)

(73) Assignee: Intel Corporation, Santa Clara, CA (US)

(*) Notice: Subject to any disclaimer, the term of this patent is extended or adjusted under 35 U.S.C. 154(b) by 275 days.

(21) Appl. No.: 10/428,249

(22) Filed: May 2, 2003

(65) Prior Publication Data

US 2004/0010754 A1  Jan. 15, 2004

Related U.S. Application Data

(60) Provisional application No. 60/377,266, filed on May 2, 2002.

(51) Int. Cl.
G06F 15/00 (2006.01)
G06F 9/45 (2006.01)
G06F 15/167 (2006.01)

(52) U.S. Cl. .............. 715/234; 715/235; 715/255; 717/136; 717/140; 717/148; 709/215

(58) Field of Classification Search .......... 715/513, 715/517, 523, 200, 204, 234–240, 249, 760, 715/210, 255, 273; 717/136, 139, 140, 147, 717/161, 106, 143, 144, 148, 153; 709/201, 709/203, 212, 215, 217, 226
See application file for complete search history.

(56) References Cited

U.S. PATENT DOCUMENTS

| | | | | |
|---|---|---|---|---|
| 5,652,883 A | * | 7/1997 | Adcock | 707/206 |
| 5,784,552 A | * | 7/1998 | Bishop et al. | 714/38 |
| 6,161,219 A | * | 12/2000 | Ramkumar et al. | 717/130 |
| 6,263,332 B1 | * | 7/2001 | Nasr et al. | 707/5 |
| 6,298,434 B1 | * | 10/2001 | Lindwer | 712/209 |
| 6,308,315 B1 | * | 10/2001 | Dice et al. | 717/106 |
| 6,327,701 B2 | * | 12/2001 | Ungar | 717/125 |
| 6,381,738 B1 | * | 4/2002 | Choi et al. | 717/140 |
| 6,502,101 B1 | * | 12/2002 | Verprauskus et al. | 707/101 |
| 6,507,857 B1 | * | 1/2003 | Yalcinalp | 715/513 |
| 6,560,774 B1 | * | 5/2003 | Gordon et al. | 717/146 |
| 6,598,141 B1 | * | 7/2003 | Dussud et al. | 711/170 |
| 6,606,743 B1 | * | 8/2003 | Raz et al. | 717/148 |

(Continued)

FOREIGN PATENT DOCUMENTS

WO  WO 99/53422  * 10/1999

OTHER PUBLICATIONS

Spyglass, "Displays Existing Web Content up to Four Times Faster on Non-PC Devices", copyright 1997, pp. 1-2.*

(Continued)

*Primary Examiner*—Doug Hutton
*Assistant Examiner*—Maikhanh Nguyen
(74) *Attorney, Agent, or Firm*—Schwabe, Williamson & Wyatt, P.C.

(57) ABSTRACT

A method and apparatus are provided for processing one or more XML documents where the processing includes a plurality of stylesheets using an abstract machine. The method includes the steps of reading a stylesheet of the plurality of stylesheets, compiling the stylesheet into a set of abstract machine instructions specialized for stylesheet processing and executing the instructions on the abstract machine.

20 Claims, 2 Drawing Sheets

Block diagram for Abstract Machine Compiler

U.S. PATENT DOCUMENTS

| | | | |
|---|---|---|---|
| 6,658,652 B1* | 12/2003 | Alexander et al. | 717/128 |
| 6,687,873 B1* | 2/2004 | Ballantyne et al. | 715/500 |
| 6,763,440 B1* | 7/2004 | Traversat et al. | 711/159 |
| 6,772,413 B2* | 8/2004 | Kuznetsov | 717/136 |
| 6,782,379 B2* | 8/2004 | Lee | 707/2 |
| 6,799,184 B2* | 9/2004 | Bhatt et al. | 707/102 |
| 6,799,299 B1* | 9/2004 | Li et al. | 715/513 |
| 6,816,871 B2* | 11/2004 | Lee | 707/104.1 |
| 6,938,204 B1* | 8/2005 | Hind et al. | 715/515 |
| 6,941,511 B1* | 9/2005 | Hind et al. | 715/523 |
| 7,032,221 B1* | 4/2006 | Chapman et al. | 718/100 |
| 2001/0039540 A1* | 11/2001 | Hofmann et al. | 707/3 |
| 2002/0052895 A1* | 5/2002 | Keating | 707/514 |
| 2002/0054090 A1* | 5/2002 | Silva et al. | 345/747 |
| 2002/0111965 A1* | 8/2002 | Kutter | 707/513 |
| 2002/0184610 A1* | 12/2002 | Chong et al. | 717/109 |
| 2003/0018668 A1* | 1/2003 | Britton et al. | 707/513 |
| 2003/0037031 A1* | 2/2003 | Birder | 707/1 |
| 2003/0037076 A1* | 2/2003 | Bravery et al. | 707/513 |
| 2003/0046317 A1* | 3/2003 | Cseri et al. | 707/513 |
| 2003/0074181 A1* | 4/2003 | Gharavy | 704/1 |
| 2003/0159111 A1* | 8/2003 | Fry | 715/513 |
| 2003/0163285 A1* | 8/2003 | Nakamura et al. | 702/179 |
| 2003/0177441 A1* | 9/2003 | Clarke et al. | 715/513 |
| 2004/0205571 A1* | 10/2004 | Adler et al. | 715/513 |
| 2004/0205577 A1* | 10/2004 | Abe et al. | 715/513 |
| 2005/0086584 A1* | 4/2005 | Sampathkumar et al. | 715/501.1 |

OTHER PUBLICATIONS

Spyglass, "Spyglass Prism Content Conversion Solution Debuted at Embedded Systems East '97", Mar. 1997, pp. 1-3.*

T. Bickmore et al., "Digestor: device-independent access to the World Wide Web", Computer Networks and ISDN Systems, 1997, pp. 1-8.*

K. Ono et al., "XSLT Sylesheet Generation by Example with WYSIWYG Editing", IBM Tokyo Research Laboratory, IEEE Computer Society, 2000, pp. 1-10.*

M. Moshfeghi et al., "XML in a Multi-Tier Java/CORBA Architecture", IEEE, Jun. 1999, pp. 1-7.*

Parameterized XSL Style Sheets, IBM, Jul. 1999, vol. 42, No. 423, pp. 1-5.*

D. Day, "XSL for fun and diversion", IBM developerWorks, Mar. 2000, pp. 1-8.*

Clark et al., XML Path Language (Xpath), Version 1.0, W3C Recommendation, <http://www.w3.org/TR/xpath>, Nov. 16, 1999.*

M. Abe et al., "Robust Pointing by XPath Language: Authoring Support and Empirical Evaluation", IEEE, Jan. 2003, pp. 156-165.*

Predescu et al., "XSLT-process minor mode," Jan. 2003, Version 2.2, pp. 1-21.*

James Clark, XSL Transformations (XSLT), W3C, Nov. 16, 1999, 74 pages.

Novoselsky et al, XSLTVM—an XSLT Virtual Machine, www.gca.org, Jun. 2000, 7 pages.

Supplementary European Search Report for EP Application 03724445, European Patent Office, Feb. 29, 2008, 2 pages.

* cited by examiner

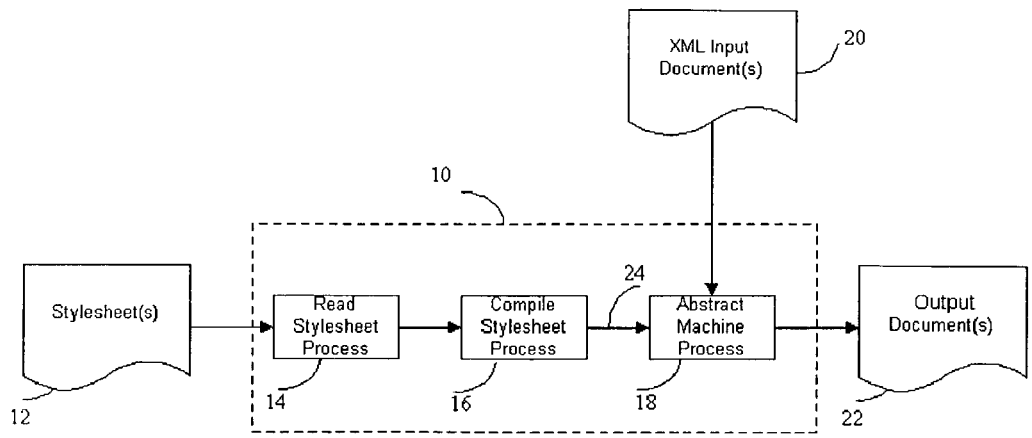
Fig. 1 Block diagram for processing XML documents with stylesheet(s) using an abstract machine
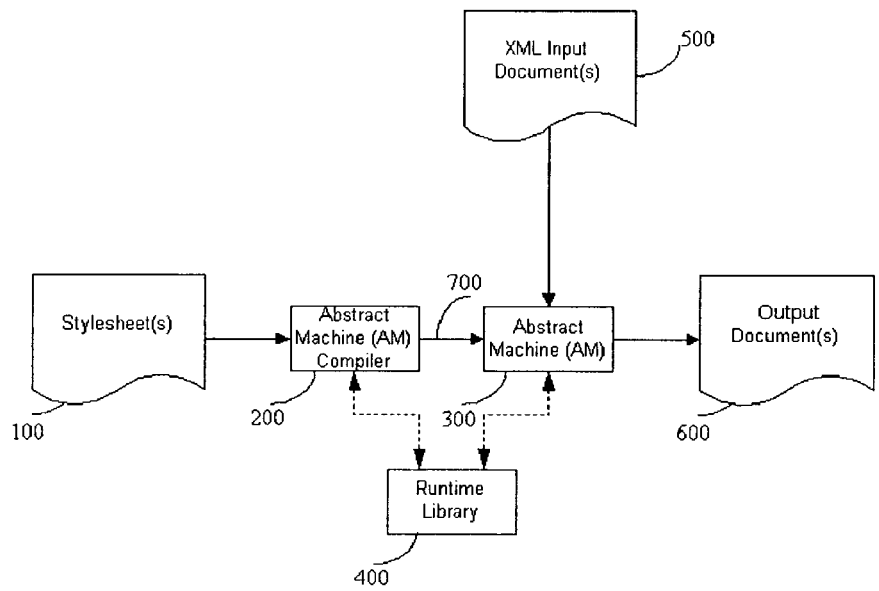
Fig. 2 Block diagram of a program for Abstract Machine (AM) based stylesheet processor

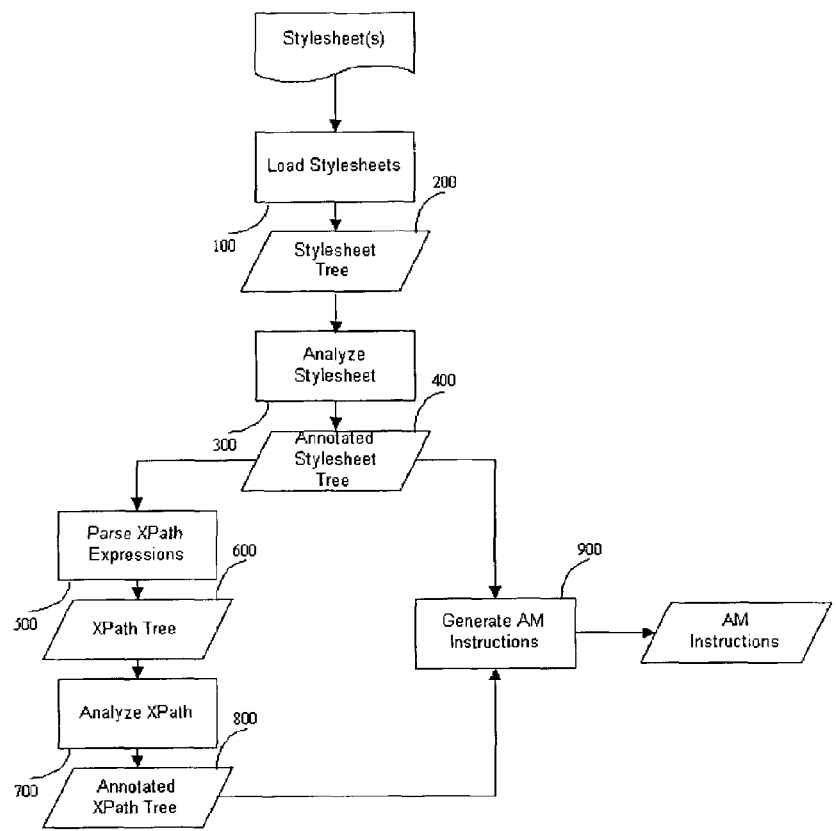
Fig. 3 Block diagram for Abstract Machine Compiler
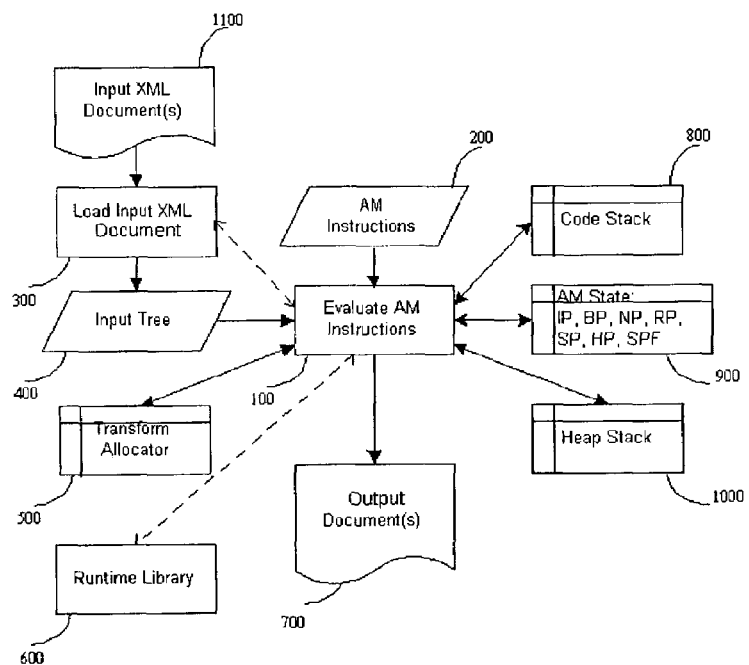
Fig. 4 Block diagram for Abstract Machine

SYSTEM AND METHOD FOR TRANSFORMATION OF XML DOCUMENTS USING STYLESHEETS

FIELD OF THE INVENTION

The field of the invention relates to the transformation of XML documents, specifically the use of a stylesheet to describe the transformation to be performed via an abstract machine.

BACKGROUND OF THE INVENTION

Extensible Markup Language (XML) is a standardized text format that can be used for transmitting structured data to web applications. XML offers significant advantages over Hypertext Markup Language (HTML) in the transmission of structured data.

In general, XML differs from HTML in at least three different ways. First, in contrast to HTML, users of XML may define additional tag and attribute names at will. Second, users of XML may nest document structures to any level of complexity. Third, optional descriptors of grammar may be added to XML to allow for the structural validation of documents. In general, XML is more powerful, is easier to implement and easier to understand.

However, XML is not backward compatible with existing HTML documents, but documents conforming to the W3C HTML 3.2 specification can be easily converted to XML, as can documents conforming to ISO 8879 (SGML).

A transformation process can be applied to a XML document to convert it from one XML format to another. Commonly the description of the transformation is contained with a second document, a "stylesheet". The transformation operates on one or more input documents and produces one or more output documents.

While existing methods of processing XML documents work relatively well, the ability to nest to any level of complexity and the optional description of grammar has resulted in processing structures that consume large amounts of memory and are, consequently, relatively slow and inefficient. Because of the importance of structured data, a need exists for a method and apparatus that is specifically structured to the needs of processing XML documents.

SUMMARY

A method and apparatus are provided for processing a stylesheet into an executable form and the execution of that form to create the transformed documents. The executable form is a set of abstract machine instructions specialized for performing the transformation operation. These instructions are executed on an abstract machine against a number of input documents to create output documents.

More particularly, the method is directed to processing one or more XML documents where the processing includes a plurality of stylesheets using an abstract machine. The method includes the steps of reading a stylesheet of the plurality of stylesheets, compiling the stylesheet into a set of abstract machine instructions specialized for stylesheet processing and executing the instructions on the abstract machine.

BRIEF DESCRIPTION OF THE DRAWINGS

FIG. 1 is a block diagram of a system for processing XML documents with stylesheets using an abstract machine under an illustrated embodiment of the invention;

FIG. 2 is a block diagram for the Abstract Machine based stylesheet processor program that may be used by the system of FIG. 1;

FIG. 3 is a block diagram for the Abstract Machine Compiler program that may be used in conjunction with the system of FIG. 1;

FIG. 4 is a block diagram for the Abstract Machine program that may be used in conjunction with the system of FIG. 1.

DETAILED DESCRIPTION

FIG. 1 depicts a system 10, shown generally, under an illustrated embodiment of the invention for processing one or more XML documents 20 with one or more stylesheets 12 using an abstract machine that executes abstract machine instructions 24 compiled from the stylesheets. As used herein, a representation of a stylesheet may be an XSLT stylesheet conformant to the W3C XSL Transformation standard. The representation of a stylesheet may also be conformant to W3C XQuery and XPath standards.

As shown in FIG. 1, the system 10 reads stylesheets 12 and transforms XML Input Documents 20 into Output Documents 22. Within the system 10, the Read Stylesheet Processor 14 may first read the stylesheets. A Compile Stylesheet processor 16 may analyze and compile the stylesheets into a set of abstract machine instructions 24. The Abstract Machine processor 18 executes the abstract machine instructions and processes the XML input documents 20 to generate the corresponding output documents 22.

FIG. 2 is a simplified block diagram of FIG. 1 showing the program structure for an abstract machine based stylesheet processor. The Stylesheet(s) 100 are converted by an Abstract Machine (AM) Compiler 200 into a set of Abstract Machine (AM) instructions 700. These instructions are executed on the Abstract Machine 300 that processes XML Input Documents 500 to create one or more Output Documents 600. The Abstract Machine may also use a Runtime Library of functions 400 to assist in performing the AM instructions. The output documents may be XML documents, HTML documents or plain text documents depending on the requirements of the transformation.

In general, before an XSLT stylesheet may be executed on the Abstract Machine it may first be compiled by an Abstract Machine Compiler into Abstract Machine (AM) instructions. The compilation process may include a number of processing steps. As a first step, each stylesheet may be loaded into memory in a tree data structure. Next, the data on the tree nodes may be analyzed and annotated with additional information. Next, for each global variable in the tree AM instructions may be generated. Finally, for each template in the tree, AM instructions may be generated.

The annotated tree may be converted into AM instructions via recursive descent processing of the tree nodes. Contained within the annotated tree nodes are XPath expressions that may also be compiled into AM instructions. Each XPath expression is compiled (recursively) into AM instructions in a very similar way to that process used for stylesheet instructions. For example, each expression may be parsed into a tree structure. Next, the data in the trees nodes may be analyzed and annotated with additional information. Finally, the AM instructions are generated from the annotated parse tree.

It should be noted that each processing step described herein (or shown in the drawings) is associated with a subroutine (i.e., a physical processing element and processor)

that accomplishes that step. Accordingly, each processing step described herein has a corresponding processor adapted to accomplish that step.

FIG. 3 is a block diagram that may be further used to describe the program structure of the Abstract Machine Compiler 200 (FIG. 2). The block "Load Stylesheets 100" (FIG. 3) functions to load the stylesheets into memory as a Stylesheet Tree 200 data structure. The next block, "Analyze Stylesheet 300" (FIG. 3) functions to analyze the Stylesheet Tree data structure and annotates it with additional information for stylesheet (XSLT) instructions found in it. The result of the analysis is output as the Annotated Stylesheet Tree 400 data structure.

The next block "Generate AM Instructions 900" (FIG. 3) functions to recursively descend through the Annotated Stylesheet Tree data structure and generates AM Instructions 1000 for each stylesheet instruction. AM instructions are generated for each global variable, template and stylesheet instruction in the tree. It also invokes Parse XPath Expressions 500 and Analyze XPath 700 processes for each XPath expression encountered in the tree. The block Generate AM Instructions 900 recursively descends through the Annotated XPath Tree 800 data structure generated by Analyze XPath and generates AM instructions for the XPath expression.

The process of the block Parse XPath Expression 500 functions to parse the XPath expression in the Annotated Stylesheet Tree data structure and generate the XPath Tree 600 data structure. The Analyze XPath 700 process functions to analyze the nodes in the XPath Tree and annotates the nodes with additional information for the XPath components found in it.

Data types will be considered next. XSLT and XPath share a common type system that has five basic data types, strings, numbers, booleans, nodesets and result tree fragments. The AM 300 (FIG. 2) is designed to be almost completely indifferent as to data type (i.e., it is type agnostic). That is, it implements only a minimal amount of functionality to support the use of the XSLT and XPath type system. By implication, the AM Compiler 200 (FIG. 2) has to be capable of performing type analysis on a XSLT stylesheet and emitting AM instructions 700 (FIG. 2) that require no type support from the AM 300 (FIG. 2) implementation. For example, string values are represented via a character pointer stored as 32 bit unsigned integer. AM instructions may directly operate on this value but they contain no assumptions that this value is a character pointer; it could equally be used to store a Boolean value.

Where typed data operations are required in the AM 300 (FIG. 2), they are implemented as external routines in the Runtime Library 400 (FIG. 2) that may be invoked by the Am. An example of such a function might be to compute the length of a string. This function can be invoked by the AM at any time but would only produce correct results if it were indeed passed a character pointer value. Passing the wrong data type to external functions results in undefined behavior.

XSLT processors have historically used runtime data type analysis. In a runtime typed system, the type of a data value is encoded with the data value so that correctly typed operations may be determined as the value is processed. The use of static type analysis has a number of advantages over such a scheme. First, the compiler can generate simpler instruction sequences by exploiting information about the types of data values used in operations. Second, the abstract machine does not need to perform runtime type checking operations and third, memory requirements for data storage can be pre-calculated by the compiler allowing for simpler data storage routines.

The main disadvantage of using statically typed data is that there is no protection against errors in the AM compilation process. An AM compiler error will result in undefined behavior but the combined effect of the advantages is that it allows for both a simpler and higher performance implementation.

One complication in XSLT static type analysis is that parameters passed to templates (similar to function arguments) are un-typed. This is because it is not possible in XSLT to statically determine a call graph for the templates used in a stylesheet. The call graph varies depending on the schema of the input documents and other factors.

In the AM Compiler 200 (FIG. 2), this issue is handled by using a special ANY type that acts as the union of the five primitive types. When an ANY type is used in an expression, runtime conversion functions are applied to convert the value to a primitive type as needed. If no conversion is possible, a runtime error is generated. The AM is not aware of the use of an ANY type just as it is not aware of the use of other primitive types; it's entirely a compiler issue. In this respect the ANY type acts as an AM independent runtime type fallback mechanism.

Type analysis will be considered next. The AM Compiler 200 (FIG. 2) has to determine the type of each expression used in a stylesheet since the AM 300 (FIG. 2) is type agnostic. XSLT expressions are always formulated using a related language called XPath. There are only two mechanisms where XSLT instructions create data values that must be stored for other instructions, variables and parameters. In both of these cases, data types can be determined by analysis of the variable or parameter declarations. As mentioned earlier, it is not possible to determine the type of a parameter at its point of use. In these cases the AM Compiler uses the ANY type also described earlier.

Type analysis for XSLT is therefore a special case of type analysis for XPath. As described earlier, a tree of nodes (XPath Tree 600 in FIG. 3) is used to represent each XPath expression after it has been parsed from its string form. Analyze XPath 700 (FIG. 3) recursively descends through the XPath Tree data structure and creates Annotated XPath Tree 800 with type and other additional information. Each node in the tree is annotated with the type of value it will generate when executed. For each node, the data type of the value of the contained expression can be determined via a combination of any input values and the nature of the operation. For example the XPath '|' (union) operator always returns a value of type nodeset. For all possible XPath expressions it is possible to determine the type of value the expression evaluates to.

There are two cases where context information from outside the expression is required in determining the type of an expression. These are where variables or parameters are used within the expression. To resolve this ambiguity, an input to the annotation of the XPath type analysis step in Analyze XPath 700 (FIG. 3) is a set of parameters/variables and the data types that they will generate when evaluated. This set is pre-computed using the same type analysis algorithm but applied to the expression used to formulate the parameter or variable. For example, the expression, concat('xx',$p+@id)

is parsed into the following tree structure,

---

Operation 'concat'
    Arg1:
        String 'xx'

-continued

```
Arg2:
    Operation '+'
        Arg1: $p (Assume parameter, i.e. ANY type)
        Arg2: Node expression
```

Rewriting this to show the types provides the result as follows:

concat(string('xx'), any($p)+nodeset(@id)).

The AM instructions 1000 (FIG. 3) are generated by a recursive descent algorithm being applied to the type annotated tree (Annotated XPath Tree 800 in FIG. 3). The AM instructions generated at the visit of each node in the tree vary with the type of node being visited. In general form, they normally cause the AM instructions to be generated for any sub tree before adding AM instructions that implement the operation of the node.

In the example case given above, it is known a prior that the result of evaluating each argument must be a string value, it is also known that the '+' operator may only be applied to two number values. Thus the expression can be re-written into the following form to indicate implicit type conversions that would be added during the compilation process.

concat('xx',string(number($p)+number(string(@id))))

The expression is not actually rewritten into this type correct form, but the Generate AM instructions 900 process (FIG. 3) inserts type conversion AM instructions as required as though this form had been used in place of the original expression.

For the example XPath expression "concat('xx',$p+@id)", following are a set of AM instructions that would be generated by the block Generate AM Instructions 900 (FIG. 3) as though the expression has been rewritten with implicit type as above.

| 382 | push_data_ptr 3 (xx0 ...) | // Push string 'xx' onto stack |
| 393 | push_stack 0,3 | // Push $p onto stack |
| 405 | number_any | // Convert $p to a number |
| 409 | reset 5 | // Search for @id |
| 417 | try 457 | |
| 425 | match attribute 8::id | |
| 441 | limit 1 | |
| 449 | collect 5 | |
| 457 | front 5 | // Extract first matching @id |
| 465 | string_node | // Convert @id to string |
| 469 | number_string | // Convert string to number |
| 473 | extern 269091114 (Number+Number) | // Add number(@id)+$p |
| 481 | string_number | // Convert result to string |
| 485 | push_data 1 (2 0 0 0 ...) | // Push 2 onto stack (arg. count) |
| 497 | extern 269077884 (Concat) | // Call concat |

The Abstract Machine will be considered next. The Abstract Machine (AM) 300 (FIG. 2) implements an instruction set for performing transformations. As discussed in the previous section, a compiler is used to generate the instruction sequence to be executed. This section focuses exclusively on the method used to execute those instructions. Only the aspects of the abstract machine sufficient to describe the claims has been included, other aspects are excluded so as not to obscure the inventive concepts.

FIG. 4 is a block diagram of the program structure for Abstract Machine 300 (FIG. 2). The Evaluate AM Instructions 100 process reads the instructions from AM Instructions 200 and executes them. The instructions use state and information maintained using registers in AM State 900, data in Code Stack 800, Heap Stack 1000, Transform Allocator 500 memory areas; traverse through the nodes in the Input Tree 400 data structure corresponding to the Input XML Documents 1100; and transform the input to produce Output Documents 700. The instructions may invoke Load Input XML Document 300 process to load Input XML Documents into Input Tree 400. The instructions may also invoke external routines contained in the Runtime Library 600.

Memory management may be considered next. A key issues in the design of an abstract machine is how to manage dynamic memory usage. It is common practice to allocate and release dynamic memory as required via general-purpose memory allocation libraries. General purpose libraries provide good flexibility in memory usage but have significant performance penalties. In the AM, three types of contiguous memory storage may be used to match the requirements of stylesheet processing, the code stack 800, the heap stack 1000 and the transform allocator 500 (FIG. 4).

The code stack 800 (FIG. 4) is a traditional programming language stack used to hold template (function) activation records, local variables and intermediate computation results. The heap stack 1000 (FIG. 4) is used to store variable length data items such as strings and lists that cannot be assigned space on the code stack at compile time. It is termed a stack as it gets reset at the end of each XSLT template invocation but in other ways it acts as a heap during a template invocation.

The final storage type is the transform allocator 500 (FIG. 4). The transform allocator is a persistent store for the period of a transform. It is used primarily to store result tree fragments (also known as temporary trees) that may be constructed across many template invocations.

By using just these three memory areas it is possible to perform XSLT transforms without the need to use general-purpose memory allocation routines. This model has a number of significant advantages over the use of general-purpose memory allocation routines. The first advantage is that allocation is very efficient. Allocation requires just a single pointer to be incremented normally via a single machine instruction.

The second advantage relates to memory release. At the end of each template invocation the stacks can be 'rolled back' to the state at the start of the template invocation normally with a single machine instruction.

Another advantage relates to reducing processing threads. As used herein, there is no need to perform multi-threaded locking to allocate memory as the memory areas are specific to an individual transform and hence to a single thread.

Additional advantages accrue due to reduced memory access times. The memory areas used herein exhibit good locality of reference, i.e. memory used at similar times is stored closely together allowing the CPU cache to improve access times.

Further, errors are reduced. As far as possible, the details of how and where memory is being used are hidden by the AM instructions thus limiting scope for memory management errors.

A description of the code stack 800 will intentionally be delayed until later when template invocation is discussed in detail. The next two sections describe the management of variable length data on the heap stack and transform persistent data on the transform allocator.

Variable length data saved in the heap stack will be considered first. The two most common data values used in a XSLT program are Strings and Nodesets. Both of these data types represent variable length data values in that each String or Nodeset is made up of a variable number of smaller elements (characters and nodes respectively). The heap stack 1000 is designed explicitly to enable this type of data to be stored easily by the AM (FIG. 4).

Data elements can be added and removed from the heap stack as is common with all heaps. Variable length data is stored in sequential locations from some start position. Pointers to the start and optionally to the end of the variable length data are maintained by the AM instructions, normally as part of the Code Stack 800.

Traditionally this type of arrangement presents problems where support is required for the updating of multiple variable length data structures. In these cases, there is the possibility of interleaving of data on the stack resulting in corruption of data values. This issue is resolved in the AM instructions by using an end pointer to the data that indicates the last valid memory address for a variable length data sequence. When a new value is added it is always placed in the location indicated by the end pointer rather than at the current stack limit.

Variable length data operations are compiled by the AM in such a way to guarantee that all operations on a single variable length structure are strictly nested. For example, given two variable length data values being computed (d1 and d2), the AM allows some part of d1 to be generated before d2 is used. Once d2 is no longer required operations can continue on d1 without corruption. In pseudo code one could write,

```
Data d1
For(i=0; i<10; i++) {
    D1.add(i);
    Data d2
    For (j=0; j<10; j++) {
        D2.add(j)
    }
}
```

This would require storage space of 20 values on the heap but at no time will the values of d1 and d2 be corrupted since d2 is only valid within a scope where d1 is not being changed. When the length of variable length data value is known and fixed at the time it is placed on the heap stack there is no need to maintain an end value as that is only required for values that can be extended.

It is entirely the responsibility of the AM compiler 200 (FIG. 2) to make sure that the instructions generated that use the heap stack do not violate the nesting model. The behavior of the abstract machine is undefined if the instruction sequence does violate this requirement.

The Transform Allocator will be considered next. The problem of determining the call graph for a transformation makes it impossible to analyze the lifetime of all data structures used during a particular transform. As a fallback mechanism, a special purpose allocator is provided to allow memory to be allocated for the duration of the current transform. Memory allocated this way has the advantage of being valid for the remainder of the transform. However because the memory is not released until the end of the transform, excessive use of the transform allocator can result in large overall memory requirements for a transform.

The transform allocator 500 (FIG. 4) obtains memory blocks from the general-purpose memory allocator. Parts of each of these blocks are used to provide storage for data structures created during the transform. Obtaining memory in blocks allows the cost of using the general purpose allocator to be amortized over a number of data structures at marginally greater memory usage.

The primary use of the transform allocator is in creating result tree fragments (or more descriptively temporary trees). Each temporary tree is in-memory representation of an XML document.

Node Instructions and Backtracking will be considered next. One of the most commonly used data types in XSLT is a nodeset. While the AM 300 (FIG. 2) design tries to avoid understanding data types, it does make an exception for nodesets and by implication node data types. Nodes have a special place in the AM because they are fundamental to the XSLT/XML processing model. Without nodes you could not have a XSLT processor but you could use XSLT without the other types although it would look quite different.

Much of the work of a XSLT processor is in evaluating path expressions that search an XML node tree for matching nodes. There are many ways in which such searches can be implemented but the AM has a specific need for performing depth first searching to allow the input XML to be demand loaded. With demand loading, an XML input document 500 is read and parsed in chunks as needed by the AM 300 (FIG. 2). Using breadth first searching techniques would cause the whole document to be loaded at the start of the first search. The depth first model allows loading to be delayed up until the depth first searching algorithm actually needs the data.

As a special case, it is sometimes necessary to employ a breadth first search model to enable the size of the result set to be calculated and used as part of the search. This model is only employed by the AM compiler 200 when needed as determined by the requirements of the search being performed. In either case, the AM instructions used for depth first searching can efficiently be used for breadth first searching if that is required.

Depth first searching can be implemented easily using a set of recursive functions calls, but that introduces an overhead for each call. In the AM 300 (FIG. 2) a similar approach is achieved via backtracking instructions.

Backtracking instructions have the unusual semantic that either they pass with the instruction pointer moving to the next instruction or they fail with the instruction pointer moving backwards to the last backtrack instruction. When the instruction pointer backtracks to an instruction it can either pass, by generating a new result, or fail with the instruction pointer moving backwards to the last backtrack instruction. The instructions can thus be said to be non-deterministic. That is: given some defined and constant input parameters, the instructions may return different results depending on some internal state stored in memory.

Using a sequence of such instructions thus implicitly performs a depth-first recursive search of some space. For example, the XPath expression 'a/b' means search for all the children of the 'a' nodes (where a is a child of the starting node) that are called 'b'. In AM instructions 700 (FIG. 2) this translates to:

Match child 'a'
Match child 'b'

Execution starts by finding the first child node of the start node that is called 'a'. Execution then continues at the second instruction that searches for all the children called 'b'. Once these have all been found, execution backtracks to the first instruction which searches for the next 'a'. If one is found, then execution continues searching for the child 'b' nodes.

It should be noted that using a smaller number of instructions is a desirable benefit of employing backtracking instructions. AM implementations contain a small performance overhead for each instruction executed. The smaller the number of instructions used to implement a search, the smaller the overhead.

In practice this code is too simplistic to do anything useful, to extend it slightly to store the results we might use the following.

```
Try 10
    Match child 'a'
    Match child 'b'
    Collect 2
10: . . .
```

The try instruction is a form of single shot go to statement. When executed, the instruction pointer is incremented as normal to the next instruction. If the instruction pointer backtracks to this instruction, then it performs a jump forward using the offset in the operand, i.e. 10. The collect instruction stores the current node value in a sequence stored at the passed offset within the current stack frame. So, as a result, this sequence evaluates the expression 'a/b' and stores the results in a sequence stored at offset 2 from the current stack frame. The storage space for the sequence is in a block that is reserved for local variables for the current template.

In this section we do not describe how state is maintained during these instructions. This is detail that is generally not relevant to anyone generating AM instructions. However to complete the picture, backtracking information is stored on the code stack 800 (FIG. 4) in a similar way to which function frames are implemented in traditional programming languages. The AM State 900 data structure maintains the current state of the Abstract Machine in a set of registers, such as the next instruction pointer within AM Instructions 200 in IP, the backtracking pointer that points to the instruction activation record on the Code Stack in BP, the current Code Stack 800 pointer in SP, the current Heap Stack 1000 pointer in HP, the node context information within the Input Tree 400 data structure including the current node in NP, the node position in RP, the stack frame pointer that points to the start of the Code Stack frame for the current block in SPF, etc. Each backtracking instruction adheres to a set of conventions that ensures it can restore the state it had when it last completed execution and can therefore continue from where it last finished to generate extra results. A description of the processing performed by a backtracking instruction is given in a later section.

Although the AM 300 (FIG. 2) is highly dependant upon backtracking instructions for searching, in other areas it uses a more traditional instruction set. For example to print the string value of each node one could write, Try 10
Match child 'a'
Match child 'b'
PushNP
External "Node->String"
OutputPushStr
Return In this case, a push instruction (PushNP) is used to transfer the current Node pointer to the Code Stack 800 (FIG. 4) before calling an external function (External "Node->String") in Runtime Library 600 (FIG. 4) that converts the pointer to a string, and then using an output instruction (OutputPushStr) that generates output from this string. These three instructions don't use backtracking but equally they don't disturb the backtracking process so that they can be used in an inline fashion. The return statement is similar to the collect instruction seen earlier but in this case it just forces backtracking without saving the current node.

Path Instructions may be considered next. The AM supports a set of instructions for dealing with Node path searches and the sequences that are created as a result. Below is brief summary of these AM instructions.

TABLE 1

Summary of path and node related AM Instructions

| | |
|---|---|
| Match <axis> [<mask>] [<uri>] [<name>] | Perform a node search from the context node using the <axis>. Nodes must match <mask>, a node type bitmap, <uri> and <name> if any is specified. |
| Reset <seq> | Set the sequence <seq> to be empty |
| Collect <seq> | Store the context node in seq. |
| Replay <seq> | Step through the nodes in seq. |
| ReplayOrdered <seq> | Step through the nodes in seq after sorting into document order. |
| Count <seq> | Count the nodes in the sequence. |
| Front <seq> | Get the first node in the sequence |
| SetRoot | Set the context node to be the document root node |
| SetCurrent | Set the context node to be the current node |
| Limit <uint> | Only allow the node at position <uint> to pass |

Blocks and Templates may be considered next. The instructions in a XSLT stylesheet are grouped into templates. Each template can be thought of as being similar to a function in a procedural programming language. Templates can be invoked in one of three ways: 1) Pattern Matching, 2) By Name and 3) By Import. The first, Pattern Matching, may be accomplished as the result of the XSLT processing model operating on the input. The second, By Name, may be accomplished as an effect of an instruction provided from inside some other template. The last, By Import, may also be accomplished as an effect of an instruction provided from inside some other template.

To support these different usage models, the AM 300 (FIG. 2) provides direct support for the concept of a block. An AM block is a collection of instructions that were compiled together to use a common stack frame. In practice this means that inside a block you cannot make reference to the variables and temporary values of the calling block, only the data values of the current block. Each template is compiled as a separate block but so are some other XSLT constructs such as parts of pattern matches.

The start of a block is indicated by a Block instruction that establishes a new stack frame pointer and reserves space on the stack for locals and temporary values: Blocks are backtracking instructions so the end of a block is marked by a return instruction. Taking the earlier example, one can place it in a block by writing, Block 2
Try 12
Match child 'a'
Match child 'b'
Collect 0
Return
Count 0
External Number->String
OutputPushStr
Return In this case, space for two 32-bit values is reserved when the block is entered for storing the sequence. Once we have generated the sequence, the following instructions starting at offset 12 are executed to convert this to a string to be output. The final return statement causes execution to return to the caller of the block.

A side effect of using blocks is that upon exit the Code Stack 800 and Heap Stack 1000 (FIG. 4) are unwound to be at (i.e., returned to) the same position when the block was called. In essence, all blocks are side effect free with respect to the Code Stack and Heap Stack.

There are four ways that a block may be called. The first method is via a pattern match instruction which finds a matching template for a node. The second is via a direct call instruction used to call a named template. The third is via a pattern match for imports which calls a template that can match with a lower import precedence than the current template and the last is via an external function calling a well known block to perform part of its work.

The final case of execution of a well-known block is used to allow external algorithms to use the facilities of the abstract machine. A good example of this is the XSLT pattern matching process. Pattern matching requires the use of very specific algorithms to achieved high performance. While support for these algorithms could be implemented as AM instructions, there is little benefit as they are so specialized. Instead, pattern matching is implemented via external routines within Runtime Library 600 (FIG. 4) with one AM instruction used to invoke them. As part of the process of performing a pattern match, it may however be necessary to execute an XPath expression, something the AM is optimized to perform. To achieve this, additional 'well-known' blocks are created in the AM machine instructions for a stylesheet whose sole purpose is to be called by an external routine when needed.

Stylesheets execution starts by executing a bootstrap block. This evaluates global variables and performs the initial pattern match for the root node. This is not actually required as execution can start anywhere in the instruction sequence but it will always be the case for a compiled stylesheet.

One issue to point out is that at the end of execution involving backtracking instructions, the AM instruction pointer will jump backwards until it reaches the starting block. It will then try and backtrack from here but there is of course no parent block. To allow this situation to be detected, there is a dummy backtrack frame inserted at the top of the stack that sets the instruction pointer to 0. This is detected by the AM 300 (FIG. 2) interpreter code and treated as an instruction to terminate execution. Further detail on how backtracking instructions, such as blocks, are implemented in the AM will be provided later.

Instruction Backtracking Implementation will be considered next. The method used for backtracking instructions is key to how the Abstract Machine 300 (FIG. 2) implements both tree searching and template/block invocation strategies. Both methods employ backtracking instructions as the primary control flow mechanism.

The AM uses a number of internal registers and the code stack to maintain state between backtracking instructions. The primary registers maintained within AM State 900 (FIG. 4) involved in backtracking are the instruction pointer (IP) and the backtrack pointer (BP). The IP always points to the currently executing instruction within AM Instructions 200, while the BP points to an instruction activation record. The instruction activation record records the IP of the previous backtracking instruction and the BP that was active when that instruction was invoked. All activation records are stored on the Code Stack that can be referenced via the register SP.

The instruction activation records thus form a chain in the stack. The process of backtracking is really a matter of taking a step back in that chain to recover previous IP and BP values. The recovered BP value indicate where the next record in the chain can be located. This scheme is similar to that employed by the code generated by many compilers although it typically only applies to function/procedure calls whereas in the AM it can also be applied to individual instructions.

There are a few common patterns used by backtracking instructions that illustrate how this scheme is used in practice. The following sections show example code for these patterns.

To create a new frame, this would typically be followed by a change to the IP, normally to move on one instruction.

| | |
|---|---|
| PUSH(BP) | // Save BP on stack |
| PUSH(IP) | // Save IP on stack |
| BP=SP | // Save location of the record in BP |

This sets the correct IP and SP so the backtracked instruction can restore its state.

To backtrack,

| | |
|---|---|
| IP=*(BP-1) | // Set IP to value stored in record |
| SP=BP | // Restore the stack |

To determine if an instruction has been backtracked, the IP of the current backtrack frame can be checked against this instruction. If they match then this instruction was reached through backtracking.

| | |
|---|---|
| *(BP-1) == IP | // Compare IP values |

While these operations are sufficient to implement a simple backtracking scheme in practice, it is also necessary to save additional information in the activation record. In the AM, the current node pointer (NP) and node position (RP) are always saved for all backtrack instructions. For some instructions, additional state information is also saved on the stack but it is always done in a way that is compatible with the standard backtrack frame, i.e. all frames have the same starting form of IP, BP, NP, and RP. This is followed by instruction specific state information.

As an example of this model, below is annotated code for implementing a Match-self AM instruction. This instruction either matches some condition (see MATCH) on the current node or fails by backtracking.

```
OpMatch* i=(OpMatch*)ip;   // Get access to instruction operands
if (!ISBACKTRACK( )) {     // Is this the first time here
    if (MATCH(i,np)) {     // If current node matches test
        PUSH(rp);          // Create backtrack frame on stack
        PUSH(np);
        PUSH(bp);
        PUSH(ip);
        bp=sp;             // Save location of backtrack frame
        rp=1;              // Reset node position
        ip+=sizeof(OpMatch);  // Move to next instruction
    } else {
        BACKTRACK( );      // Failed match so just jump back
    }
} else {
    CHECKIP( );            // We backtracked to here. There is no
    POPUP(bp);             // way for a second attempt as this is
    POPN(np);              // a match self so just restore saved
    POPU(rp);              // state and backtrack.
    BACKTRACK( );
}
```

It should be clear that the Block AM instruction can be simply constructed as a basic backtracking instruction as above. That is, when a Block instruction is executed, a new backtracking record is added to the stack. This ensures that when the instructions within the block complete execution, control is returned to this block instruction. When a Block instruction is backtracked to it simply invokes another backtrack to return control to the caller of the block. The Block instruction performs additional steps in reserving space on the stack (by incrementing the code stack pointer) and restoring the stack & heap pointers on backtracking thus releasing any memory used by the instructions inside the block.

A Summary of relevant AM Instructions will be provided next. The following table summarizes AM Instructions that are relevant for stylesheet processing. Note that this is not a complete set of all AM instructions. It should also be noted that the AM instructions relevant to stylesheet processing of Table 2 are specialized for stylesheet processing based upon the use of such features as depth first searching and backtracking. Table 2 lists the name of the AM Instruction in the first column, brief description of the instruction in the second column and whether the instruction is a backtracking instruction (Y) or not (N) in the third column.

TABLE 2

Summary of AM Instructions relevant for stylesheet processing

| Instruction | Description | Backtracking? |
| --- | --- | --- |
| Block | Start a new block | Y |
| Return | Unconditionally backtrack | Y |
| Quit | Terminate execution | N |
| Error | Report error | N |
| Message | Display message on console | N |
| Try | Jump to an offset on backtracking | Y |
| Tree | Create a temporary tree to replace current output destination | Y |
| Reset | Set a nodeset to be empty | N |
| Collect | Append the context node to a nodeset | Y |
| Replay | Cause iteration over a nodeset | Y |
| Replay_ordered | Cause iteration in node order of a nodeset | Y |
| Replay_tree | Cause the replay of tree as though each node in the tree was part of a nodeset | Y |
| Count | Caluclate the number of nodes in a nodeset | N |
| Count_number | As for count but return a double value | N |
| Front | Extract the first node in a nodeset | N |
| Save_ns | Transfer a nodeset to transform allocator memory space | N |
| Save_str | Copy a string into transform allocator memory | N |
| Document1 | Implement a form of the XPath document( ) function | N |
| Document2 | Implement a form of the XPath document( ) function | N |
| Document3 | Implement a form of the XPatb document( ) function | N |
| Document4 | Implement a form of the XPath document( ) function | N |
| Sort | Implement a custom nodeset sort function | N |
| Number | Implement a XSLT number format operation | N |
| Limit | Limit backtracking through this instruction to number times | N |
| LimitN | As limit but take limit argument from the stack | N |
| Match self | Search for matching nodes according to XPath rules | Y |
| Match child | Search for matching nodes according to XPath rules | Y |
| Match attribute | Search for matching nodes according to XPath rules | Y |
| Match namespace | Search for matching nodes according to XPath rules | Y |
| Match parent | Search for matching nodes according to XPath rules | Y |
| Match ancestor | Search for matching nodes according to XPath rules | Y |
| Match ancestor-or-self | Search for matching nodes according to XPath rules | Y |
| Match following-sibling | Search for matching nodes according to XPath rules | Y |
| Match preceding-sibling | Search for matching nodes according to XPath rules | Y |
| Match descendant | Search for matching nodes according to XPath rules | Y |
| Match descendant-or-self | Search for matching nodes according to XPath rules | Y |
| Match following | Search for matching nodes according to XPath rules | Y |
| Match preceding | Search for matching nodes according to XPath rules | Y |
| Set_root | Set the node considered the current document root node | N |
| Set_current | Set the node considered the current node | N |
| Swap_current | Swap the context and current nodes | N |
| Extern | Call an external support routine | N |
| Push_data_ptr | Push a pointer value onto the stack | N |
| Push_data | Push a sequence of data values onto the stack | N |
| Push_value | Push a value onto the stack | N |
| Copy | Copy data from/to stack locations | N |
| Copyg | Copy data from/to stack and global stack locations | N |
| PushNP | Push value on NP onto stack | N |
| PopNP | Pop value of NP from stack | N |
| PushHP | Push Value of HP onto stack | N |
| PopHP | Pop Value of HP from stack | N |
| PushRP | Push Value of RP onto stack | N |
| PushLP | Push value of LP onto stack | N |
| Jump | Unconditional Jump | N |
| JumpEq | Jump on equality | N |
| JumpNeq | Jump on inequality | N |
| Not | Reverse a boolean value | N |
| OutCopyNode | Pass a node to the output handler | N |
| OutStartElement | Call start element routine on output handler | N |
| OutEndElement | Call end element output handler | N |
| OutString | Call output handler with a string | N |
| OutCopyTree | Pass a tree to the output handler | N |
| OutPI | Call PI routine on output handler | N |

TABLE 2-continued

Summary of AM Instructions relevant for stylesheet processing

| Instruction | Description | Backtracking? |
| --- | --- | --- |
| OutAttribute | Call Attribute routine on output handler | N |
| OutComment | Call Comment routine on output handler | N |
| PatternMatch | Initiate pattern matching | N |
| Call | Call a block by location | Y |
| LocalRef | Resolve the data in a local variable | N |
| GlobalRef | Resolve the data in a global variable | N |
| String Node | Convert node to string | N |
| String Boolean | Convert Boolean to string | N |
| String Number | Convert number to string | N |
| String Any | Convert ANY to string | N |
| Number Boolean | Convert Boolean to number | N |
| Number String | Convert string to number | N |
| Number Any | Convert ANY to number | N |
| Boolean Number | Convert number to Boolean | N |
| Boolean String | Convert string to Boolean | N |
| Boolean Any | Convert ANY to Boolean | N |
| Nodeset Any | Convert ANY to nodeset | |

EXAMPLE TRANSFORMATION

The following section contains a trace of an example transformation of a sample XML input document by a stylesheet performed with the Abstract Machine 300 (FIG. 2). The stylesheet, XML input document and output are shown first followed by an Abstract Machine instruction listing and a trace of the abstract machine state after each instruction. The stylesheet is as follows.

```
<xsl:stylesheet verison="1.0" xmlns:xsl="http://www.w3.org/1999/XSL/Tranform">

<xsl:template match="/">
    <xsl:apply-templates select="name"/>
</xsl:template>
<xsl:template match="name">
    <greeting>
        <xsl:value-of select="firstname"/>
    </greeting>
</xsl:template>
</xsl:stylesheet>
```

The input document is as follows.

```
<name>
    <firstname>Kevin</firstname>
    <surname>Jones</surname>
</name>
```

The expected output is as follows.

```
<?xml version="1.0" encoding="utf-8"?>
<greeting>Kevin</greeting>
```

The Abstract Machine instruction listing for the above example stylesheet is reproduced below. Note that it is annotated with comments starting with "//" to the right of the AM instructions, as well as lines starting with "!" that provide the source stylesheet instruction that causes the set of AM instructions to be output immediately following the stylesheet source line.

```
! bootstrap
0      block 0,00000000                        // Create a bootstrap block (used for globals)
12     output_mode 0                           // Set output format mode
20     pattern_match                           // Start pattern matching
36     return file:/d:/Sarvega/extern/napa/bin/ex.xsl:3
! Template Match=// Name=
40     block 2,003D9E78                        // Create a block, reserving 2x32bit on stack file:/d:/Sarvega/extern/napa/bin/ex.xsl:4
! xsl:apply-templates
52     try 180                                 // Try the next code, on backtrack goto 180
60     param_block                             // Init a parameter block
64     push_data 1 (0 0 0 0 . . .)
76     reset 0                                 // Reset the nodelist at stack+0
84     try 156                                 // Try the next code, on backtrack goto 156
92     match child 2::name                     // Pattern match
108    pattern_match_or_collect  0
124    match child 65535::
140    pattern_match
156    replay 0
164    pattern_match
180    return                                  // All done
```

```
file:/d:/Sarvega/extern/napa/bin/ex.xsl:7
! Template Match=name Name=
184    block 2,003D8C30                        // Create a block & reserve 2x32 bit value file:/d:/Sarvega/extern/napa/bin/ex.xsl:8
196    output_xsl_start_element :greeting      // Output a start element file:/d:/Sarvega/extern/napa/bin/ex.xsl:9
! xsl:value-of
244    reset 0                                 // Reset nodest at stack+0
252    try 292                                 // Try the next code, on backtrack goto 292
260    match child 2::firstname                // Find child element called 'firstname'
276    limit 1                                 // Limit backtracking to first result only
284    collect 0                               // Store NP in nodelist at 0 and backtrack
292    from 0                                  // Set NP to first node in sequence 0
300    string_node:                            // Convert NP to a string representation
304    output_string                           // Output a string
312    output_xsl_end_element                  // Terminate an element
360    return                                  // Backtrack
```

Below is a trace of the Abstract Machine State 900 (FIG. 4) reported between each Abstract Machine instruction. The fields are, IP—Instruction pointer (offset is difference from start of listing)
BP—Backtrack pointer
SP—Code stack pointer
HP—Heap stack pointer Both the contents of the Code Stack 800 and Heap Stack 1000 (FIG. 4) are shown with values growing left to right and top to bottom. The memory dumps shown in the traces assume execution on a little-endian architecture.

```
****************************************************************
IP: 003D8050(offset 0) BP: 035B0004    SP: 035B0004    HP: 00DA0000

Next Instruction:    block 0,00000000

Code Stack:
Length=0

0  0  0  0  0  0  0  0  0  0  0  0  0  0  0  0 ................

Heap Stack:
Length=0

0  0  0  0  0  0  0  0  0  0  0  0  0  0  0  0 ................

****************************************************************
IP: 003D805C(offset 12)    BP: 035B0014    SP: 035B0014    HP: 00DA0000

Next Instruction:    output_mode 0

Code Stack:
Length=10

1  0  0  0  0 40 cd  0  4  0 5b  3 50 80 3d  0 .....@....[.P.=.

0  0  0  0  0  0  0  0  0  0  0  0  0  0  0  0 ................

Heap Stack:
Length=0

0  0  0  0  0  0  0  0  0  0  0  0  0  0  0  0 ................

****************************************************************
IP: 003D8064(offset 20)    BP: 035B0014    SP: 035B0014    HP: 00DA0000

Next Instruction:    pattern_match

Code Stack:
Length=10

1  0  0  0  0 40 cd  0  4  0 5b  3 50 80 3d  0 .....@....[.P.=.

0  0  0  0  0  0  0  0  0  0  0  0  0  0  0  0 ................

Heap Stack:
```

```
Length=0

0   0   0   0   0   0   0   0   0   0   0   0   0   0   0   0   0 ................

*************************************************************************

IP: 003D8078(offset 40)      BP: 035B003C    SP: 035B003C    HP: 00DA0000

Next Instruction:       block 2,003D9DC8

Code Stack:
Length=38

1   0   0   0   0  40  cd   0   4   0  5b   3  50  80  3d   0 .....@....[.P.=.

0   0   0   0   0  40  cd   0   4   0  5b   3   0   0  da   0 .....@....[.....

0   0   0   0   1   0   0   0   1   0   0   0   0  40  cd   0 .............@..

14   0  5b   3  64  80  3d   0   0   0   0   0   0   0   0   0 ..[.d.=.........

Heap Stack:
Length=0

0   0   0   0   0   0   0   0   0   0   0   0   0   0   0   0   0 ................

*************************************************************************

IP: 003D8084(offset 52)      BP: 035B0054    SP: 035B0054    HP: 00DA0000

Next Instruction:       try b4

Code Stack:
Length=50

1   0   0   0   0  40  cd   0   4   0  5b   3  50  80  3d   0 .....@....[.P.=.

0   0   0   0   0  40  cd   0   4   0  5b   3   0   0  da   0 .....@....[.....

0   0   0   0   1   0   0   0   1   0   0   0   0  40  cd   0 .............@..

14   0  5b   3  64  80  3d   0   0   0   0   0   0   0   0   0 ..[.d.=.........

1   0   0   0   0  40  cd   0  3c   0  5b   3  78  80  3d   0 .....@..<.[.x.=.

0   0   0   0   0   0   0   0   0   0   0   0   0   0   0   0 ................

Heap Stack:
Length=0

0   0   0   0   0   0   0   0   0   0   0   0   0   0   0   0   0 ................

*************************************************************************

IP: 003D808C(offset 60)      BP: 035B0068    SP: 035B0068    HP: 00DA0000

Next Instruction:       param_block

Code Stack:
Length=64

1   0   0   0   0  40  cd   0   4   0  5b   3  50  80  3d   0 .....@....[.P.=.

0   0   0   0   0  40  cd   0   4   0  5b   3   0   0  da   0 .....@....[.....

0   0   0   0   1   0   0   0   1   0   0   0   0  40  cd   0 .............@..

14   0  5b   3  64  80  3d   0   0   0   0   0   0   0   0   0 ..[.d.=.........

1   0   0   0   0  40  cd   0  3c   0  5b   3  78  80  3d   0 .....@..<.[.x.=.
```

```
 1  0  0  0  1  0  0  0  0 40 cd  0 54  0 5b  3   .........@.T.[.
84 80 3d  0  0  0  0  0  0  0  0  0  0  0  0  0   ..=.............
```

Heap Stack:
Length=0

```
 0  0  0  0  0  0  0  0  0  0  0  0  0  0  0  0   ................
```

************************************************************************

IP: 003D8090(offset 64)     BP: 035B007C    SP: 035B007C    HP: 00DA0000

Next Instruction:     push_data 1 (0 0 0 0 ...)

Code Stack:
Length=78

```
 1  0  0  0  0 40 cd  0  4  0 5b  3 50 80 3d  0   .....@....[.P.=.
 0  0  0  0  0 40 cd  0  4  0 5b  3  0  0 da  0   .....@....[.....
 0  0  0  0  1  0  0  0  1  0  0  0  0 40 cd  0   .............@..
14  0 5b  3 64 80 3d  0  0  0  0  0  0  0  0  0   ..[.d.=.........
 1  0  0  0  0 40 cd  0 3c  0 5b  3 78 80 3d  0   .....@..<.[.x.=.
 1  0  0  0  1  0  0  0  0 40 cd  0 54  0 5b  3   .........@.T.[.
84 80 3d  0  0  0  0  0  1  0  0  0  0 40 cd  0   ..=..........@..
68  0 5b  3 8c 80 3d  0  0  0  0  0  0  0  0  0   h.[...=.........
```

Heap Stack:
Length=0

```
 0  0  0  0  0  0  0  0  0  0  0  0  0  0  0  0   ................
```

************************************************************************

IP: 003D809C(offset 76)     BP: 035B007C    SP: 035B0080    HP: 00DA0000

Next Instruction:     reset 0

Code Stack:
Length=7c

```
 1  0  0  0  0 40 cd  0  4  0 5b  3 50 80 3d  0   .....@....[.P.=.
 0  0  0  0  0 40 cd  0  4  0 5b  3  0  0 da  0   .....@....[.....
 0  0  0  0  1  0  0  0  1  0  0  0  0 40 cd  0   .............@..
14  0 5b  3 64 80 3d  0  0  0  0  0  0  0  0  0   ..[.d.=.........
 1  0  0  0  0 40 cd  0 3c  0 5b  3 78 80 3d  0   .....@..<.[.x.=.
 1  0  0  0  1  0  0  0  0 40 cd  0 54  0 5b  3   .........@.T.[.
84 80 3d  0  0  0  0  0  1  0  0  0  0 40 cd  0   ..=..........@..
68  0 5b  3 8c 80 3d  0  0  0  0  0  0  0  0  0   h.[...=.........
```

Heap Stack:
Length=0

```
 0  0  0  0  0  0  0  0  0  0  0  0  0  0  0  0   ................
```

************************************************************************

```
IP: 003D80A4(offset 84)     BP: 035B007C   SP: 035B0080   HP: 00DA0000
Next Instruction:      try 9c
Code Stack:
Length=7c 1   0   0   0   0  40  cd   0   4   0  5b   3  50  80  3d   0  .....@....[.P.=.
   0   0   0   0   0  40  cd   0   4   0  5b   3   0   0  da   0  .....@....[.....
   0   0   0   0   1   0   0   0   1   0   0   0   0  40  cd   0  .............@..
  14   0  5b   3  64  80  3d   0   0   0   0   0   0   0   0   0  ..[.d.=.........
   1   0   0   0   0  40  cd   0  3c   0  5b   3  78  80  3d   0  .....@..<.[.x.=.
   1   0   0   0   1   0   0   0   0  40  cd   0  54   0  5b   3  .........@..T.[.
  84  80  3d   0   0   0   0   0   1   0   0   0   0  40  cd   0  ..=..........@..
  68   0  5b   3  8c  80  3d   0   0   0   0   0   0   0   0   0  h.[...=.........

Heap Stack:
Length=0

0   0   0   0   0   0   0   0   0   0   0   0   0   0   0   0  ................

************************************************************************

IP: 003D80AC(offset 92)     BP: 035B0094   SP: 035B0094   HP: 00DA0000
Next Instruction:      match child 2::name
Code Stack:
Length=90

1   0   0   0   0  40  cd   0   4   0  5b   3  50  80  3d   0  .....@....[.P.=.
   0   0   0   0   0  40  cd   0   4   0  5b   3   0   0  da   0  .....@....[.....
   0   0   0   0   1   0   0   0   1   0   0   0   0  40  cd   0  .............@..
  14   0  5b   3  64  80  3d   0   0   0   0   0   0   0   0   0  ..[.d.=.........
   1   0   0   0   0  40  cd   0  3c   0  5b   3  78  80  3d   0  .....@..<.[.x.=.
   1   0   0   0   1   0   0   0   0  40  cd   0  54   0  5b   3  .........@..T.[.
  84  80  3d   0   0   0   0   0   1   0   0   0   0  40  cd   0  ..=..........@..
  68   0  5b   3  8c  80  3d   0   0   0   0   0   1   0   0   0  h.[...=.........
   1   0   0   0   0  40  cd   0  7c   0  5b   3  a4  80  3d   0  .....@..|.[...=.
   0   0   0   0   0   0   0   0   0   0   0   0   0   0   0   0  ................

Heap Stack:
Length=0

0   0   0   0   0   0   0   0   0   0   0   0   0   0   0   0  ................

************************************************************************

IP: 003D80BC(offset 108)    BP: 035B00A4   SP: 035B00A4   HP: 00DA0000
Next Instruction:      pattern_match_or_collect :0
Code Stack:
Length=a0

1   0   0   0   0  40  cd   0   4   0  5b   3  50  80  3d   0  .....@....[.P.=.
```

```
 0  0  0  0  0 40 cd  0  4  0 5b  3  0  0 da  0    .....@....[....
 0  0  0  0  1  0  0  0  1  0  0  0  0 40 cd  0    .............@..
14  0 5b  3 64 80 3d  0  0  0  0  0  0  0  0  0    ..[.d.=.........
 1  0  0  0  0 40 cd  0 3c  0 5b  3 78 80 3d  0    .....@..<.[.x.=.
 1  0  0  0  1  0  0  0  0 40 cd  0 54  0 5b  3    .........@..T.[.
84 80 3d  0  0  0  0  0  1  0  0  0  0 40 cd  0    ..=..........@..
68  0 5b  3 8c 80 3d  0  0  0  0  0  1  0  0  0    h.[...=.........
 1  0  0  0  0 40 cd  0 7c  0 5b  3 a4 80 3d  0    .....@..|.[...=.
 1  0  0  0  0 40 cd  0 94  0 5b  3 ac 80 3d  0    .....@....[...=.
 0  0  0  0  0  0  0  0  0  0  0  0  0  0  0  0    ................

Heap Stack:
Length=0

0  0  0  0  0  0  0  0  0  0  0  0  0  0  0  0    ................

***********************************************************************
IP: 003D8108(offset 184)    BP: 035B00CC   SP: 035B00CC   HP: 00DA0004

Next Instruction:      block 2,003D8AE8

Code Stack:
Length=c8

1  0  0  0  0 40 cd  0  4  0 5b  3 50 80 3d  0    .....@....[.P.=.
 0  0  0  0  0 40 cd  0  4  0 5b  3  0  0 da  0    .....@....[....
 0  0  0  0  1  0  0  0  1  0  0  0  0 40 cd  0    .............@..
14  0 5b  3 64 80 3d  0  0  0 da  0  4  0 da  0    ..[.d.=.........
 1  0  0  0  0 40 cd  0 3c  0 5b  3 78 80 3d  0    .....@..<.[.x.=.
 1  0  0  0  1  0  0  0  0 40 cd  0 54  0 5b  3    .........@..T.[.
84 80 3d  0  0  0  0  0  1  0  0  0  0 40 cd  0    ..=..........@..
68  0 5b  3 8c 80 3d  0  0  0  0  0  1  0  0  0    h.[...=.........
 1  0  0  0  0 40 cd  0 7c  0 5b  3 a4 80 3d  0    .....@..|.[...=.
 1  0  0  0  0 40 cd  0 94  0 5b  3 ac 80 3d  0    .....@....[...=.
7c  0 5b  3  0 40 cd  0 3c  0 5b  3  4  0 da  0    |.[..@..<.[.....
 0  0  0  0  1  0  0  0  1  0  0  0 5c 40 cd  0    ............\@..
a4  0 5b  3 bc 80 3d  0  0  0  0  0  0  0  0  0    ..[...=.........

Heap Stack:
Length=4

0  0  0  0  0  0  0  0  0  0  0  0  0  0  0  0    ................

***********************************************************************
IP: 003D8114(offset 196)    BP: 035B00E4   SP: 035B00E4   HP: 00DA0004

Next Instruction:      output xsl_start_element :greeting

Code Stack:
```

```
Length=e0
  1  0  0  0  0 40 cd  0  4  0 5b  3 50 80 3d  0  .....@....[.P.=.
  0  0  0  0  0 40 cd  0  4  0 5b  3  0  0 da  0  .....@....[.....
  0  0  0  0  1  0  0  0  1  0  0  0  0 40 cd  0  .............@..
 14  0 5b  3 64 80 3d  0  0  0 da  0  4  0 da  0  ..[.d.=.........
  1  0  0  0  0 40 cd  0 3c  0 5b  3 78 80 3d  0  .....@..<.[.x.=.
  1  0  0  0  1  0  0  0  0 40 cd  0 54  0 5b  3  .........@..T.[.
 84 80 3d  0  0  0  0  0  1  0  0  0  0 40 cd  0  ..=..........@..
 68  0 5b  3 8c 80 3d  0  0  0  0  0  1  0  0  0  h.[...=.........
  1  0  0  0  0 40 cd  0 7c  0 5b  3 a4 80 3d  0  .....@..|.[...=.
  1  0  0  0  0 40 cd  0 94  0 5b  3 ac 80 3d  0  .....@....[...=.
 7c  0 5b  3  0 40 cd  0 3c  0 5b  3  4  0 da  0  |.[..@..<.[.....
  0  0  0  0  1  0  0  0  1  0  0  0 5c 40 cd  0  ............\@..
 a4  0 5b  3 bc 80 3d  0  0  0  0  0  0  0  0  0  ..[...=.........
  1  0  0  0 5c 40 cd  0 cc  0 5b  3  8 81 3d  0  ....\@....[...=.
  0  0  0  0  0  0  0  0  0  0  0  0  0  0  0  0  ................

Heap Stack:
Length=4

0  0  0  0  0  0  0  0  0  0  0  0  0  0  0  0  ................

****************************************************************************

IP: 003D8144(offset 244)    BP: 035B00E4   SP: 035B00E4   HP: 00DA0004

Next Instruction:     reset 0

Code Stack:
Length=e0

1  0  0  0  0 40 cd  0  4  0 5b  3 50 80 3d  0  .....@....[.P.=.
  0  0  0  0  0 40 cd  0  4  0 5b  3  0  0 da  0  .....@....[.....
  0  0  0  0  1  0  0  0  1  0  0  0  0 40 cd  0  .............@..
 14  0 5b  3 64 80 3d  0  0  0 da  0  4  0 da  0  ..[.d.=.........
  1  0  0  0  0 40 cd  0 3c  0 5b  3 78 80 3d  0  .....@..<.[.x.=.
  1  0  0  0  1  0  0  0  0 40 cd  0 54  0 5b  3  .........@..T.[.
 84 80 3d  0  0  0  0  0  1  0  0  0  0 40 cd  0  ..=..........@..
 68  0 5b  3 8c 80 3d  0  0  0  0  0  1  0  0  0  h.[...=.........
  1  0  0  0  0 40 cd  0 7c  0 5b  3 a4 80 3d  0  .....@..|.[...=.
  1  0  0  0  0 40 cd  0 94  0 5b  3 ac 80 3d  0  .....@....[...=.
 7c  0 5b  3  0 40 cd  0 3c  0 5b  3  4  0 da  0  |.[..@..<.[.....
  0  0  0  0  1  0  0  0  1  0  0  0 5c 40 cd  0  ............\@..
 a4  0 5b  3 bc 80 3d  0  0  0  0  0  0  0  0  0  ..[...=.........
  1  0  0  0 5c 40 cd  0 cc  0 5b  3  8 81 3d  0  ....\@....[...=.
```

```
 0  0  0  0  0  0  0  0  0  0  0  0  0  0  0  0  0  0  0 ...................

Heap Stack:
Length=4

0  0  0  0  0  0  0  0  0  0  0  0  0  0  0  0  0  0  0 ...................

*********************************************************************

IP: 003D814C(offset 252)      BP: 035B00E4    SP: 035B00E4    HP: 00DA0004

Next Instruction:      try 124

Code Stack:
Length=e0

1  0  0  0  0 40 cd  0  4  0 5b  3 50 80 3d  0  ......@....[.P.=.
 0  0  0  0  0 40 cd  0  4  0 5b  3  0  0 da  0  ......@....[.....
 0  0  0  0  1  0  0  0  1  0  0  0  0 40 cd  0  .............@..
14  0 5b  3 64 80 3d  0  0  0 da  0  4  0 da  0  ..[.d.=.........
 1  0  0  0  0 40 cd  0 3c  0 5b  3 78 80 3d  0  ......@..<.[.x.=.
 1  0  0  0  1  0  0  0  0 40 cd  0 54  0 5b  3  .........@..T.[.
84 80 3d  0  0  0  0  0  1  0  0  0  0 40 cd  0  ..=..........@..
68  0 5b  3 8c 80 3d  0  0  0  0  0  1  0  0  0  h.[...=.........
 1  0  0  0  0 40 cd  0 7c  0 5b  3 a4 80 3d  0  ......@..|.[...=.
 1  0  0  0  0 40 cd  0 94  0 5b  3 ac 80 3d  0  ......@....[...=.
7c  0 5b  3  0 40 cd  0 3c  0 5b  3  4  0 da  0  |.[..@..<.[.....
 0  0  0  0  1  0  0  0  1  0  0  0 5c 40 cd  0  ............\@..
a4  0 5b  3 bc 80 3d  0  0  0  0  0  0  0  0  0  ..[...=.........
 1  0  0  0 5c 40 cd  0 cc  0 5b  3  8 81 3d  0  ....\@....[...=.
 0  0  0  0  0  0  0  0  0  0  0  0  0  0  0  0  ................

Heap Stack:
Length=4

0  0  0  0  0  0  0  0  0  0  0  0  0  0  0  0  0 ..................

*********************************************************************

IP: 003D8154(offset 260)      BP: 035B00F8    SP: 035B00F8    HP: 00DA0004

Next Instruction:      match child 2::firstname

Code Stack:
Length=f4

1  0  0  0  0 40 cd  0  4  0 5b  3 50 80 3d  0  ......@....[.P.=.
 0  0  0  0  0 40 cd  0  4  0 5b  3  0  0 da  0  ......@....[.....
 0  0  0  0  1  0  0  0  1  0  0  0  0 40 cd  0  .............@..
14  0 5b  3 64 80 3d  0  0  0 da  0  4  0 da  0  ..[.d.=.........
 1  0  0  0  0 40 cd  0 3c  0 5b  3 78 80 3d  0  ......@..<.[.x.=.
 1  0  0  0  1  0  0  0  0 40 cd  0 54  0 5b  3  .........@..T.[.
```

```
  84 80 3d  0  0  0  0  0  1  0  0  0  0 40 cd  0   ...=..........@..
  68  0 5b  3 8c 80 3d  0  0  0  0  0  1  0  0  0   h.[...=.........
   1  0  0  0  0 40 cd  0 7c  0 5b  3 a4 80 3d  0   .....@..|.[...=.
   1  0  0  0  0 40 cd  0 94  0 5b  3 ac 80 3d  0   .....@....[...=.
  7c  0 5b  3  0 40 cd  0 3c  0 5b  3  4  0 da  0   |.[..@..<.[.....
   0  0  0  0  1  0  0  0  1  0  0  0 5c 40 cd  0   ............\@..
  a4  0 5b  3 bc 80 3d  0  0  0  0  0  0  0  0  0   ..[...=.........
   1  0  0  0 5c 40 cd  0 cc  0 5b  3  8 81 3d  0   ....\@....[...=.
   1  0  0  0  1  0  0  0 5c 40 cd  0 e4  0 5b  3   ........\@....[.
  4c 81 3d  0  0  0  0  0  0  0  0  0  0  0  0  0   L.=.............

Heap Stack:
Length=4

0  0  0  0  0  0  0  0  0  0  0  0  0  0  0  0   ................

********************************************************************************

IP: 003D8164(offset 276)    BP: 035B0108   SP: 035B0108   HP: 00DA0004

Next Instruction:    limit 1

Code Stack:
Length=104

1  0  0  0  0 40 cd  0  4  0 5b  3 50 80 3d  0   .....@....[.P.=.
   0  0  0  0  0 40 cd  0  4  0 5b  3  0  0 da  0   .....@....[.....
   0  0  0  0  1  0  0  0  1  0  0  0  0 40 cd  0   .............@..
  14  0 5b  3 64 80 3d  0  0  0 da  0  4  0 da  0   ..[.d.=.........
   1  0  0  0  0 40 cd  0 3c  0 5b  3 78 80 3d  0   .....@..<.[.x.=.
   1  0  0  0  1  0  0  0  0 40 cd  0 54  0 5b  3   .........@..T.[.
  84 80 3d  0  0  0  0  0  1  0  0  0  0 40 cd  0   ...=.........@..
  68  0 5b  3 8c 80 3d  0  0  0  0  0  1  0  0  0   h.[...=.........
   1  0  0  0  0 40 cd  0 7c  0 5b  3 a4 80 3d  0   .....@..|.[...=.
   1  0  0  0  0 40 cd  0 94  0 5b  3 ac 80 3d  0   .....@....[...=.
  7c  0 5b  3  0 40 cd  0 3c  0 5b  3  4  0 da  0   |.[..@..<.[.....
   0  0  0  0  1  0  0  0  1  0  0  0 5c 40 cd  0   ............\@..
  a4  0 5b  3 bc 80 3d  0  0  0  0  0  0  0  0  0   ..[...=.........
   1  0  0  0 5c 40 cd  0 cc  0 5b  3  8 81 3d  0   ....\@....[...=.
   1  0  0  0  1  0  0  0 5c 40 cd  0 e4  0 5b  3   ........\@....[.
  4c 81 3d  0  1  0  0  0 5c 40 cd  0 f8  0 5b  3   L.=.....\@....[.
  54 81 3d  0  0  0  0  0  0  0  0  0  0  0  0  0   T.=.............

Heap Stack:
Length=4

0  0  0  0  0  0  0  0  0  0  0  0  0  0  0  0   ................
```

```
*****************************************************************
IP: 003D816C(offset 284)    BP: 035B0118   SP: 035B0118   HP: 00DA0004

Next Instruction:      collect 0

Code Stack:
Length=114

1   0   0   0   0  40  cd   0   4   0  5b   3  50  80  3d   0  .....@....[.P.=.

0   0   0   0   0  40  cd   0   4   0  5b   3   0   0  da   0  .....@....[.....

0   0   0   0   1   0   0   0   1   0   0   0   0  40  cd   0  .............@..

14   0  5b   3  64  80  3d   0   0   0  da   0   4   0  da   0  ...[.d.=........

1   0   0   0   0  40  cd   0  3c   0  5b   3  78  80  3d   0  .....@..<.[.x.=.

1   0   0   0   1   0   0   0   0  40  cd   0  54   0  5b   3  .........@..T.[.

84  80  3d   0   0   0   0   0   1   0   0   0   0  40  cd   0  ..=..........@..

68   0  5b   3  8c  80  3d   0   0   0   0   0   1   0   0   0  h.[...=.........

1   0   0   0   0  40  cd   0  7c   0  5b   3  a4  80  3d   0  .....@..|.[...=.

1   0   0   0   0  40  cd   0  94   0  5b   3  ac  80  3d   0  .....@....[...=.

7c   0  5b   3   0  40  cd   0  3c   0  5b   3   4   0  da   0  |.[..@..<.[.....

0   0   0   0   1   0   0   0   1   0   0   0  5c  40  cd   0  ............\@..

a4   0  5b   3  bc  80  3d   0   0   0   0   0   0   0   0   0  ..[...=.........

1   0   0   0  5c  40  cd   0  cc   0  5b   3   8  81  3d   0  ....\@....[...=.

1   0   0   0   1   0   0   0  5c  40  cd   0  e4   0  5b   3  ........\@....[.

4c  81  3d   0   1   0   0   0  5c  40  cd   0  f8   0  5b   3  L.=.....\@....[.

54  81  3d   0   1   0   0   0  67  41  cd   0   8   1  5b   3  T.=.....gA....[.

64  81  3d   0   0   0   0   0   0   0   0   0   0   0   0   0  d.=.............

Heap Stack:
Length=4

0   0   0   0   0   0   0   0   0   0   0   0   0   0   0   0  ................

*****************************************************************
IP: 003D8164(offset 276)    BP: 035B0118   SP: 035B0118   HP: 00DA0008

Next Instruction:      limit 1

Code Stack:
Length=114

1   0   0   0   0  40  cd   0   4   0  5b   3  50  80  3d   0  .....@....[.P.=.

0   0   0   0   0  40  cd   0   4   0  5b   3   0   0  da   0  .....@....[.....

0   0   0   0   1   0   0   0   1   0   0   0   0  40  cd   0  .............@..

14   0  5b   3  64  80  3d   0   0   0  da   0   4   0  da   0  ...[.d.=........

1   0   0   0   0  40  cd   0  3c   0  5b   3  78  80  3d   0  .....@..<.[.x.=.

1   0   0   0   1   0   0   0   0  40  cd   0  54   0  5b   3  .........@..T.[.

84  80  3d   0   0   0   0   0   1   0   0   0   0  40  cd   0  ..=..........@..

68   0  5b   3  8c  80  3d   0   0   0   0   0   1   0   0   0  h.[...=.........
```

```
    1  0  0  0  0 40 cd  0 7c  0 5b  3 a4 80 3d  0  .....@..|.[...=.
    1  0  0  0  0 40 cd  0 94  0 5b  3 ac 80 3d  0  .....@...[...=.
   7c  0 5b  3  0 40 cd  0 3c  0 5b  3  4  0 da  0  |.[..@..<.[.....
    0  0  0  0  1  0  0  0  1  0  0  0 5c 40 cd  0  ............\@..
   a4  0 5b  3 bc 80 3d  0  4  0 da  0  8  0 da  0  ..[...=.........
    1  0  0  0 5c 40 cd  0 cc  0 5b  3  8 81 3d  0  ....\@....[...=.
    1  0  0  0  1  0  0  0 5c 40 cd  0 e4  0 5b  3  ........\@....[.
   4c 81 3d  0  1  0  0  0 5c 40 cd  0 f8  0 5b  3  L.=.....\@....[.
   54 81 3d  0  1  0  0  0 67 41 cd  0  8  1 5b  3  T.=.....gA....[.
   64 81 3d  0  0  0  0  0  0  0  0  0  0  0  0  0  d.=.............

Heap Stack:
Length=8

0  0  0  0 67 41 cd  0  0  0  0  0  0  0  0  0  ....gA..........

****************************************************************

IP: 003D814C(offset 252)    BP: 035B00F8   SP: 035B00F8   HP: 00DA0008

Next Instruction:       try 124

Code Stack:
Length=f4

1  0  0  0  0 40 cd  0  4  0 5b  3 50 80 3d  0  .....@....[.P.=.
    0  0  0  0  0 40 cd  0  4  0 5b  3  0  0 da  0  .....@....[.....
    0  0  0  0  1  0  0  0  1  0  0  0  0 40 cd  0  .............@..
   14  0 5b  3 64 80 3d  0  0  0 da  0  4  0 da  0  ..[.d.=.........
    1  0  0  0  0 40 cd  0 3c  0 5b  3 78 80 3d  0  .....@..<.[.x.=.
    1  0  0  0  1  0  0  0  0 40 cd  0 54  0 5b  3  .........@..T.[.
   84 80 3d  0  0  0  0  0  1  0  0  0  0 40 cd  0  ..=..........@..
   68  0 5b  3 8c 80 3d  0  0  0  0  0  1  0  0  0  h.[...=.........
    1  0  0  0  0 40 cd  0 7c  0 5b  3 a4 80 3d  0  .....@..|.[...=.
    1  0  0  0  0 40 cd  0 94  0 5b  3 ac 80 3d  0  .....@...[...=.
   7c  0 5b  3  0 40 cd  0 3c  0 5b  3  4  0 da  0  |.[..@..<.[.....
    0  0  0  0  1  0  0  0  1  0  0  0 5c 40 cd  0  ............\@..
   a4  0 5b  3 bc 80 3d  0  4  0 da  0  8  0 da  0  ..[...=.........
    1  0  0  0 5c 40 cd  0 cc  0 5b  3  8 81 3d  0  ....\@....[...=.
    1  0  0  0  1  0  0  0 5c 40 cd  0 e4  0 5b  3  ........\@....[.
   4c 81 3d  0  0  0  0  0  0  0  0  0  0  0  0  0  L.=.............

Heap Stack:
Length=8

0  0  0  0 67 41 cd  0  0  0  0  0  0  0  0  0  ....gA..........

****************************************************************
```

```
IP: 003D8174(offset 292)    BP: 035B00E4    SP: 035B00E4    HP: 00DA0008
Next Instruction:    front 0

Code Stack:
Length=e0

1  0  0  0  0 40 cd  0  4  0 5b  3 50 80 3d  0    .....@....[.P.=.
  0  0  0  0  0 40 cd  0  4  0 5b  3  0  0 da  0    .....@....[.....
  0  0  0  0  1  0  0  0  1  0  0  0  0 40 cd  0    .............@..
 14  0 5b  3 64 80 3d  0  0  0 da  0  4  0 da  0    ..[.d.=.........
  1  0  0  0  0 40 cd  0 3c  0 5b  3 78 80 3d  0    .....@..<.[.x.=.
  1  0  0  0  1  0  0  0  0 40 cd  0 54  0 5b  3    .........@..T.[.
 84 80 3d  0  0  0  0  0  1  0  0  0  0 40 cd  0    ..=..........@..
 68  0 5b  3 8c 80 3d  0  0  0  0  0  1  0  0  0    h.[...=.........
  1  0  0  0  0 40 cd  0 7c  0 5b  3 a4 80 3d  0    .....@..|.[...=.
  1  0  0  0  0 40 cd  0 94  0 5b  3 ac 80 3d  0    .....@....[...=.
 7c  0 5b  3  0 40 cd  0 3c  0 5b  3  4  0 da  0    |.[..@..<.[.....
  0  0  0  0  1  0  0  0  1  0  0  0 5c 40 cd  0    ............\@..
 a4  0 5b  3 bc 80 3d  0  4  0 da  0  8  0 da  0    ..[...=.........
  1  0  0  0 5c 40 cd  0 cc  0 5b  3  8 81 3d  0    ....\@....[...=.
  0  0  0  0  0  0  0  0  0  0  0  0  0  0  0  0    ................

Heap Stack:
Length=8

0  0  0  0 67 41 cd  0  0  0  0  0  0  0  0  0    ....gA..........

*********************************************************************

IP: 003D817C(offset 300)    BP: 035B00E4    SP: 035B00E8    HP: 00DA0008
Next Instruction:    string_node Code Stack:
Length=e4

1  0  0  0  0 40 cd  0  4  0 5b  3 50 80 3d  0    .....@....[.P.=.
  0  0  0  0  0 40 cd  0  4  0 5b  3  0  0 da  0    .....@....[.....
  0  0  0  0  1  0  0  0  1  0  0  0  0 40 cd  0    .............@..
 14  0 5b  3 64 80 3d  0  0  0 da  0  4  0 da  0    ..[.d.=.........
  1  0  0  0  0 40 cd  0 3c  0 5b  3 78 80 3d  0    .....@..<.[.x.=.
  1  0  0  0  1  0  0  0  0 40 cd  0 54  0 5b  3    .........@..T.[.
 84 80 3d  0  0  0  0  0  1  0  0  0  0 40 cd  0    ..=..........@..
 68  0 5b  3 8c 80 3d  0  0  0  0  0  1  0  0  0    h.[...=.........
  1  0  0  0  0 40 cd  0 7c  0 5b  3 a4 80 3d  0    .....@..|.[...=.
  1  0  0  0  0 40 cd  0 94  0 5b  3 ac 80 3d  0    .....@....[...=.
 7c  0 5b  3  0 40 cd  0 3c  0 5b  3  4  0 da  0    |.[..@..<.[.....
  0  0  0  0  1  0  0  0  1  0  0  0 5c 40 cd  0    ............\@..
```

```
a4  0 5b  3 bc 80 3d  0  4  0 da  0  8  0 da  0  ..[..=........
 1  0  0  0 5c 40 cd  0 cc  0 5b  3  8 81 3d  0  ...\@....[..=.
67 41 cd  0  0  0  0  0  0  0  0  0  0  0  0  0  gA............
```

Heap Stack:
Length=8

```
 0  0  0  0 67 41 cd  0  0  0  0  0  0  0  0  0  ....gA..........
```

********************************************************************

IP: 003D8180(offset 304)    BP: 035B00E4    SP: 035B00E8    HP: 00DA0008
Next Instruction:    output_string Code Stack:
Length=e4

```
 1  0  0  0  0 40 cd  0  4  0 5b  3 50 80 3d  0  .....@....[.P.=.
 0  0  0  0  0 40 cd  0  4  0 5b  3  0  0 da  0  .....@....[.....
 0  0  0  0  1  0  0  0  1  0  0  0  0 40 cd  0  .............@..
14  0 5b  3 64 80 3d  0  0  0 da  0  4  0 da  0  ..[.d.=.........
 1  0  0  0  0 40 cd  0 3c  0 5b  3 78 80 3d  0  .....@..<.[.x.=.
 1  0  0  0  1  0  0  0  0 40 cd  0 54  0 5b  3  .........@..T.[.
84 80 3d  0  0  0  0  1  0  0  0  0 40 cd  0    ..=.........@..
68  0 5b  3 8c 80 3d  0  0  0  0  0  1  0  0  0  h.[...=.........
 1  0  0  0  0 40 cd  0 7c  0 5b  3 a4 80 3d  0  .....@..|.[...=.
 1  0  0  0  0 40 cd  0 94  0 5b  3 ac 80 3d  0  .....@....[...=.
7c  0 5b  3  0 40 cd  0 3c  0 5b  3  4  0 da  0  |.[..@..<.[.....
 0  0  0  0  1  0  0  0  1  0  0  0 5c 40 cd  0  ............\@..
a4  0 5b  3 bc 80 3d  0  4  0 da  0  8  0 da  0  ..[...=.........
 1  0  0  0 5c 40 cd  0 cc  0 5b  3  8 81 3d  0  ....\@....[..=.
23 42 cd  0  0  0  0  0  0  0  0  0  0  0  0  0  #B..............
```

Heap Stack:
Length=8

```
 0  0  0  0 67 41 cd  0  0  0  0  0  0  0  0  0  ....gA..........
```

********************************************************************

IP: 003D8188(offset 312)    BP: 035B00E4    SP: 035B00E4    HP: 00DA0008
Next Instruction:    output_xsl_end_element Code Stack:
Length=e0

```
 1  0  0  0  0 40 cd  0  4  0 5b  3 50 80 3d  0  .....@....[.P.=.
 0  0  0  0  0 40 cd  0  4  0 5b  3  0  0 da  0  .....@....[.....
 0  0  0  0  1  0  0  0  1  0  0  0  0 40 cd  0  .............@..
14  0 5b  3 64 80 3d  0  0  0 da  0  4  0 da  0  ..[.d.=.........
```

```
 1  0  0  0  0 40 cd  0 3c  0 5b  3 78 80 3d  0  ......@..<.[.x.=.
 1  0  0  0  1  0  0  0  0 40 cd  0 54  0 5b  3  .........@..T.[.
84 80 3d  0  0  0  0  0  1  0  0  0  0 40 cd  0  ..=..........@..
68  0 5b  3 8c 80 3d  0  0  0  0  0  1  0  0  0  h.[...=.........
 1  0  0  0  0 40 cd  0 7c  0 5b  3 a4 80 3d  0  .....@..|.[...=.
 1  0  0  0  0 40 cd  0 94  0 5b  3 ac 80 3d  0  .....@....[...=.
7c  0 5b  3  0 40 cd  0 3c  0 5b  3  4  0 da  0  |.[..@..<.[.....
 0  0  0  0  1  0  0  0  1  0  0  0  5c 40 cd  0  ............\@..
a4  0 5b  3 bc 80 3d  0  4  0 da  0  8  0 da  0  ..[...=.........
 1  0  0  0 5c 40 cd  0 cc  0 5b  3  8 81 3d  0  ....\@....[...=.
 0  0  0  0  0  0  0  0  0  0  0  0  0  0  0  0  ................
```

Heap Stack:
Length=8

```
 0  0  0  0 67 41 cd  0  0  0  0  0  0  0  0  0  ....gA..........
```

************************************************************

IP: 003D81B8(offset 360)    BP: 035B00E4    SP: 035B00E4    HP: 00DA0008

Next Instruction:    return

Code Stack:
Length=e0

```
 1  0  0  0  0 40 cd  0  4  0 5b  3 50 80 3d  0  .....@....[.P.=.
 0  0  0  0  0 40 cd  0  4  0 5b  3  0  0 da  0  .....@....[.....
 0  0  0  0  1  0  0  0  1  0  0  0  0 40 cd  0  .............@..
14  0 5b  3 64 80 3d  0  0  0 da  0  4  0 da  0  ..[.d.=.........
 1  0  0  0  0 40 cd  0 3c  0 5b  3 78 80 3d  0  .....@..<.[.x.=.
 1  0  0  0  1  0  0  0  0 40 cd  0 54  0 5b  3  .........@..T.[.
84 80 3d  0  0  0  0  0  1  0  0  0  0 40 cd  0  ..=..........@..
68  0 5b  3 8c 80 3d  0  0  0  0  0  1  0  0  0  h.[...=.........
 1  0  0  0  0 40 cd  0 7c  0 5b  3 a4 80 3d  0  .....@..|.[...=.
 1  0  0  0  0 40 cd  0 94  0 5b  3 ac 80 3d  0  .....@....[...=.
7c  0 5b  3  0 40 cd  0 3c  0 5b  3  4  0 da  0  |.[..@..<.[.....
 0  0  0  0  1  0  0  0  1  0  0  0  5c 40 cd  0  ............\@..
a4  0 5b  3 bc 80 3d  0  4  0 da  0  8  0 da  0  ..[...=.........
 1  0  0  0 5c 40 cd  0 cc  0 5b  3  8 81 3d  0  ....\@....[...=.
 0  0  0  0  0  0  0  0  0  0  0  0  0  0  0  0  ................
```

Heap Stack:
Length=8

```
 0  0  0  0 67 41 cd  0  0  0  0  0  0  0  0  0  ....gA..........
```

************************************************************

```
IP: 003D8108(offset 184)      BP: 035B00E4    SP: 035B00E4    HP: 00DA0008
Next Instruction:      block 2, 003D8AE8

Code Stack:
Length=e0

1  0  0  0  0 40 cd  0  4  0 5b  3 50 80 3d  0  .....@....[.P.=.
  0  0  0  0  0 40 cd  0  4  0 5b  3  0  0 da  0  .....@....[.....
  0  0  0  0  1  0  0  0  1  0  0  0  0 40 cd  0  .............@..
 14  0 5b  3 64 80 3d  0  0  0 da  0  4  0 da  0  ..[.d.=.........
  1  0  0  0  0 40 cd  0 3c  0 5b  3 78 80 3d  0  .....@..<.[.x.=.
  1  0  0  0  1  0  0  0  0 40 cd  0 54  0 5b  3  .........@..T.[.
 84 80 3d  0  0  0  0  0  1  0  0  0  0 40 cd  0  ..=..........@..
 68  0 5b  3 8c 80 3d  0  0  0  0  0  1  0  0  0  h.[...=.........
  1  0  0  0  0 40 cd  0 7c  0 5b  3 a4 80 3d  0  .....@..|.[...=.
  1  0  0  0  0 40 cd  0 94  0 5b  3 ac 80 3d  0  .....@....[...=.
 7c  0 5b  3  0 40 cd  0 3c  0 5b  3  4  0 da  0  |.[..@..<.[.....
  0  0  0  0  1  0  0  0  1  0  0  0 5c 40 cd  0  ............\@..
 a4  0 5b  3 bc 80 3d  0  4  0 da  0  8  0 da  0  ..[...=.........
  1  0  0  0 5c 40 cd  0 cc  0 5b  3  8 81 3d  0  ....\@....[...=.
  0  0  0  0  0  0  0  0  0  0  0  0  0  0  0  0  ................

Heap Stack:
Length=8

0  0  0  0 67 41 cd  0  0  0  0  0  0  0  0  0  ....gA..........

*************************************************************************
IP: 003D80BC(offset 108)      BP: 035B00CC    SP: 035B00CC    HP: 00DA0008
Next Instruction:      pattern_match_or_collect :0

Code Stack:
Length=c8

1  0  0  0  0 40 cd  0  4  0 5b  3 50 80 3d  0  .....@....[.P.=.
  0  0  0  0  0 40 cd  0  4  0 5b  3  0  0 da  0  .....@....[.....
  0  0  0  0  1  0  0  0  1  0  0  0  0 40 cd  0  .............@..
 14  0 5b  3 64 80 3d  0  0  0 da  0  4  0 da  0  ..[.d.=.........
  1  0  0  0  0 40 cd  0 3c  0 5b  3 78 80 3d  0  .....@..<.[.x.=.
  1  0  0  0  1  0  0  0  0 40 cd  0 54  0 5b  3  .........@..T.[.
 84 80 3d  0  0  0  0  0  1  0  0  0  0 40 cd  0  ..=..........@..
 68  0 5b  3 8c 80 3d  0  0  0  0  0  1  0  0  0  h.[...=.........
  1  0  0  0  0 40 cd  0 7c  0 5b  3 a4 80 3d  0  .....@..|.[...=.
  1  0  0  0  0 40 cd  0 94  0 5b  3 ac 80 3d  0  .....@....[...=.
 7c  0 5b  3  0 40 cd  0 3c  0 5b  3  4  0 da  0  |.[..@..<.[.....
  0  0  0  0  1  0  0  0  1  0  0  0 5c 40 cd  0  ............\@..
```

```
a4  0 5b  3 bc 80 3d  0  0  0  0  0  0  0  0  0   ..[..=........
```

Heap Stack:
Length=8

```
 0  0  0  0 67 41 cd  0  0  0  0  0  0  0  0  0   ....gA..........
```

********************************************************************

IP: 003D80AC(offset 92)    BP: 035B00A4    SP: 035B00A4    HP: 00DA0004

Next Instruction:     match child 2::name

Code Stack:
Length=a0

```
 1  0  0  0  0 40 cd  0  4  0 5b  3 50 80 3d  0   .....@....[.P.=.
 0  0  0  0  0 40 cd  0  4  0 5b  3  0  0 da  0   .....@....[.....
 0  0  0  0  1  0  0  0  1  0  0  0  0 40 cd  0   .............@..
14  0 5b  3 64 80 3d  0  0  0 da  0  4  0 da  0   ..[.d.=.........
 1  0  0  0  0 40 cd  0 3c  0 5b  3 78 80 3d  0   .....@..<.[.x.=.
 1  0  0  0  1  0  0  0  0 40 cd  0 54  0 5b  3   .........@..T.[.
84 80 3d  0  0  0  0  0  1  0  0  0  0 40 cd  0   ..=..........@..
68  0 5b  3 8c 80 3d  0  0  0  0  0  1  0  0  0   h.[...=.........
 1  0  0  0  0 40 cd  0 7c  0 5b  3 a4 80 3d  0   .....@..|.[...=.
 1  0  0  0  0 40 cd  0 94  0 5b  3 ac 80 3d  0   .....@....[...=.
 0  0  0  0  0  0  0  0  0  0  0  0  0  0  0  0   ................
```

Heap Stack:
Length=4

```
 0  0  0  0  0  0  0  0  0  0  0  0  0  0  0  0   ................
```

********************************************************************

IP: 003D80A4(offset 84)    BP: 035B0094    SP: 035B0094    HP: 00DA0004

Next Instruction:     try 9c

Code Stack:
Length=90

```
 1  0  0  0  0 40 cd  0  4  0 5b  3 50 80 3d  0   .....@....[.P.=.
 0  0  0  0  0 40 cd  0  4  0 5b  3  0  0 da  0   .....@....[.....
 0  0  0  0  1  0  0  0  1  0  0  0  0 40 cd  0   .............@..
14  0 5b  3 64 80 3d  0  0  0 da  0  4  0 da  0   ..[.d.=.........
 1  0  0  0  0 40 cd  0 3c  0 5b  3 78 80 3d  0   .....@..<.[.x.=.
 1  0  0  0  1  0  0  0  0 40 cd  0 54  0 5b  3   .........@..T.[.
84 80 3d  0  0  0  0  0  1  0  0  0  0 40 cd  0   ..=..........@..
68  0 5b  3 8c 80 3d  0  0  0  0  0  1  0  0  0   h.[...=.........
 1  0  0  0  0 40 cd  0 7c  0 5b  3 a4 80 3d  0   .....@..|.[...=.
 0  0  0  0  0  0  0  0  0  0  0  0  0  0  0  0   ................
```

```
Heap Stack:
Length=4

0  0  0  0  0  0  0  0  0  0  0  0  0  0  0  0   ................

************************************************************************

IP: 003D80EC(offset 156)     BP: 035B007C   SP: 035B0080   HP: 00DA0004

Next Instruction:     replay 0

Code Stack:
Length=7c 1  0  0  0  0 40 cd  0  4  0 5b  3 50 80 3d  0   .....@....[.P.=.
   0  0  0  0  0 40 cd  0  4  0 5b  3  0  0 da  0   .....@....[.....
   0  0  0  0  1  0  0  0  1  0  0  0  0 40 cd  0   .............@..
  14  0 5b  3 64 80 3d  0  0  0 da  0  4  0 da  0   ..[.d.=.........
   1  0  0  0  0 40 cd  0 3c  0 5b  3 78 80 3d  0   .....@..<.[.x.=.
   1  0  0  0  1  0  0  0  0 40 cd  0 54  0 5b  3   .........@..T.[.
  84 80 3d  0  0  0  0  0  1  0  0  0  0 40 cd  0   ..=..........@..
  68  0 5b  3 8c 80 3d  0  0  0  0  0  0  0  0  0   h.[...=.........

Heap Stack:
Length=4

0  0  0  0  0  0  0  0  0  0  0  0  0  0  0  0   ................

************************************************************************

IP: 003D80F4(offset 164)     BP: 035B0098   SP: 035B0098   HP: 00DA0004

Next Instruction:     pattern match

Code Stack:
Length=94

1  0  0  0  0 40 cd  0  4  0 5b  3 50 80 3d  0   .....@....[.P.=.
   0  0  0  0  0 40 cd  0  4  0 5b  3  0  0 da  0   .....@....[.....
   0  0  0  0  1  0  0  0  1  0  0  0  0 40 cd  0   .............@..
  14  0 5b  3 64 80 3d  0  0  0 da  0  4  0 da  0   ..[.d.=.........
   1  0  0  0  0 40 cd  0 3c  0 5b  3 78 80 3d  0   .....@..<.[.x.=.
   1  0  0  0  1  0  0  0  0 40 cd  0 54  0 5b  3   .........@..T.[.
  84 80 3d  0  0  0  0  0  1  0  0  0  0 40 cd  0   ..=..........@..
  68  0 5b  3 8c 80 3d  0  0  0  0  0  0  0  0  0   h.[...=.........
   4  0 da  0  1  0  0  0  0 40 cd  0 7c  0 5b  3   .........@..|.[.
  ec 80 3d  0  0  0  0  0  0  0  0  0  0  0  0  0   ..=.............

Heap Stack:
Length=4

0  0  0  0  0  0  0  0  0  0  0  0  0  0  0  0   ................

************************************************************************

IP: 003D80EC(offset 156)     BP: 035B0098   SP: 035B0098   HP: 00DA0004
```

```
Next Instruction:      replay 0

Code Stack:
Length=94

1  0  0  0  0 40 cd  0  4  0 5b  3 50 80 3d  0   .....@....[.P.=.
 0  0  0  0  0 40 cd  0  4  0 5b  3  0  0 da  0   .....@....[.....
 0  0  0  0  1  0  0  0  1  0  0  0  0 40 cd  0   .............@..
14  0 5b  3 64 80 3d  0  0  0 da  0  4  0 da  0   ..[.d.=.........
 1  0  0  0  0 40 cd  0 3c  0 5b  3 78 80 3d  0   .....@..<.[.x.=.
 1  0  0  0  1  0  0  0  0 40 cd  0 54  0 5b  3   .........@..T.[.
84 80 3d  0  0  0  0  0  1  0  0  0  0 40 cd  0   ..=..........@..
68  0 5b  3 8c 80 3d  0  0  0  0  0  0  0  0  0   h.[...=.........
 4  0 da  0  1  0  0  0  0 40 cd  0 7c  0 5b  3   .........@..|.[.
ec 80 3d  0  0  0  0  0  0  0  0  0  0  0  0  0   ..=.............

Heap Stack:
Length=4

0  0  0  0  0  0  0  0  0  0  0  0  0  0  0  0   ................

********************************************************************

IP: 003D808C(offset 60)    BP: 035B007C   SP: 035B007C   HP: 00DA0004

Next Instruction:     param_block

Code Stack:
Length=78

1  0  0  0  0 40 cd  0  4  0 5b  3 50 80 3d  0   .....@....[.P.=.
 0  0  0  0  0 40 cd  0  4  0 5b  3  0  0 da  0   .....@....[.....
 0  0  0  0  1  0  0  0  1  0  0  0  0 40 cd  0   .............@..
14  0 5b  3 64 80 3d  0  0  0 da  0  4  0 da  0   ..[.d.=.........
 1  0  0  0  0 40 cd  0 3c  0 5b  3 78 80 3d  0   .....@..<.[.x.=.
 1  0  0  0  1  0  0  0  0 40 cd  0 54  0 5b  3   .........@..T.[.
84 80 3d  0  0  0  0  0  1  0  0  0  0 40 cd  0   ..=..........@..
68  0 5b  3 8c 80 3d  0  0  0  0  0  0  0  0  0   h.[...=.........

Heap Stack:
Length=4

0  0  0  0  0  0  0  0  0  0  0  0  0  0  0  0   ................

********************************************************************

IP: 003D8084(offset 52)    BP: 035B0068   SP: 035B0068   HP: 00DA0004

Next Instruction:      try b4

Code Stack:
Length=64

1  0  0  0  0 40 cd  0  4  0 5b  3 50 80 3d  0   .....@....[.P.=.
```

```
   0   0   0   0   0  40  cd   0   4   0  5b   3   0   0  da   0  .....@....[.....
   0   0   0   0   1   0   0   0   1   0   0   0   0  40  cd   0  ................@..
  14   0  5b   3  64  80  3d   0   0   0  da   0   4   0  da   0  ..[.d.=.........
   1   0   0   0   0  40  cd   0  3c   0  5b   3  78  80  3d   0  .....@..<.[.x.=.
   1   0   0   0   1   0   0   0   0  40  cd   0  54   0  5b   3  .........@..T.[.
  84  80  3d   0   0   0   0   0   0   0   0   0   0   0   0   0  ..=.............
```

Heap Stack:
Length=4

```
   0   0   0   0   0   0   0   0   0   0   0   0   0   0   0   0  ................
```

**********************************************************************

IP: 003D8104(offset 180)    BP: 035B0054    SP: 035B0054    HP: 00DA0004

Next Instruction:    return

Code Stack:
Length=50

```
   1   0   0   0   0  40  cd   0   4   0  5b   3  50  80  3d   0  .....@....[.P.=.
   0   0   0   0   0  40  cd   0   4   0  5b   3   0   0  da   0  .....@....[.....
   0   0   0   0   1   0   0   0   1   0   0   0   0  40  cd   0  ................@..
  14   0  5b   3  64  80  3d   0   0   0  da   0   4   0  da   0  ..[.d.=.........
   1   0   0   0   0  40  cd   0  3c   0  5b   3  78  80  3d   0  .....@..<.[.x.=.
   0   0   0   0   0   0   0   0   0   0   0   0   0   0   0   0  ................
```

Heap Stack:
Length=4

```
   0   0   0   0   0   0   0   0   0   0   0   0   0   0   0   0  ................
```

**********************************************************************

IP: 003D8078(offset 40)    BP: 035B0054    SP: 035B0054    HP: 00DA0004

Next Instruction:    block 2,003D9DCB

Code Stack:
Length=50

```
   1   0   0   0   0  40  cd   0   4   0  5b   3  50  80  3d   0  .....@....[.P.=.
   0   0   0   0   0  40  cd   0   4   0  5b   3   0   0  da   0  .....@....[.....
   0   0   0   0   1   0   0   0   1   0   0   0   0  40  cd   0  ................@..
  14   0  5b   3  64  80  3d   0   0   0  da   0   4   0  da   0  ..[.d.=.........
   1   0   0   0   0  40  cd   0  3c   0  5b   3  78  80  3d   0  .....@..<.[.x.=.
   0   0   0   0   0   0   0   0   0   0   0   0   0   0   0   0  ................
```

Heap Stack:
Length=4

```
   0   0   0   0   0   0   0   0   0   0   0   0   0   0   0   0  ................
```

**********************************************************************

```
IP: 003D8064(offset 20)      BP: 035B003C   SP: 035B003C   HP: 00DA0004

Next Instruction:      pattern_match

Code Stack:
Length=38

1  0  0  0  0 40 cd  0  4  0 5b  3 50 80 3d  0    .....@....[.P.=.
  0  0  0  0  0 40 cd  0  4  0 5b  3  0  0 da  0    .....@....[.....
  0  0  0  1  0  0  0  1  0  0  0  0 40 cd  0       ............@..
 14  0 5b  3 64 80 3d  0  0  0  0  0  0  0  0  0    ..[.d.=.........

Heap Stack:
Length=4

0  0  0  0  0  0  0  0  0  0  0  0  0  0  0  0    ................

********************************************************************************

IP: 003D8050(offset 0) BP: 035B0014   SP: 035B0014   HP: 00DA0000

Next Instruction:    block 0,00000000

Code Stack:
Length=10

1  0  0  0  0 40 cd  0  4  0 5b  3 50 80 3d  0    .....@....[.P.=.
  0  0  0  0  0  0  0  0  0  0  0  0  0  0  0  0    ................

Heap Stack:
Length=0

0  0  0  0  0  0  0  0  0  0  0  0  0  0  0  0    ................
```

The invention claimed is:

1. A computer-implemented method for processing one or more XML documents, where the processing includes a plurality of stylesheets using an abstract machine, the method comprising:
   reading a stylesheet of the plurality of stylesheets;
   parsing at least some Xpath expressions within the plurality of stylesheets into a respective tree of nodes;
   annotating the respective tree of nodes of the Xpath expressions with a data type of the Xpath expression;
   compiling the respective annotated tree of nodes of the Xpath expressions into a set of abstract machine instructions specialized for stylesheet processing, wherein the set of abstract machine instructions comprises a plurality of blocks of abstract machine instructions for the compiled stylesheet and includes a backtracking abstract machine instruction for each block of the plurality of blocks;
   executing the instructions on an abstract machine to produce an output document, wherein the abstract machine uses a plurality of types of contiguous memory storage to match requirements of the stylesheet processing and wherein the plurality of types of contiguous memory storage includes a code stack, a heap stack and a transform allocator;
   resetting the code stack and the heap stack upon processing completing of each block of the plurality of blocks; and
   calling a block of the plurality of blocks via a pattern match for imports which calls a template that can match with a lower import precedence than a current template,
   wherein the executing the abstract machine instruction set in the abstract machine further comprises processing a representation of the one or more XML documents.

2. The method of claim 1 further comprising calling a block of the plurality of blocks via a pattern matching instruction.

3. The method of claim 1 further comprising calling a block of the plurality of blocks via a direct call instruction used to call a named template.

4. The method of claim 1 further comprising calling a block of the plurality of blocks via an external function call.

5. The method of claim 1 wherein at least some of the set of abstract machine instructions further comprise abstract machine instructions for tree searches of the one or more XML documents.

6. The method of claim 1 wherein at least some of the set of abstract machine instructions further comprise abstract machine instructions for storing and manipulating results of tree searching the one or more XML documents.

7. The method of claim 6 further comprising using the transform allocator to store tree fragments constructed across many template invocations.

8. The method of claim 1 wherein the step of executing the instructions on the abstract machine instructions further comprises maintaining XSLT templar invocation state using a memory stack.

9. The method of claim 1 wherein the step of executing the instructions on the abstract machine instructions further comprises providing a transform allocator storage area for maintaining temporary data for processing.

10. The method of claim 1 further comprising providing a memory stack for maintaining variable length data of the abstract machine.

11. The method of claim 1 wherein the step of compiling the stylesheet further comprises identifying a type of each data value used in the stylesheet.

12. The method of claim 7 wherein the step of identifying a type of each data value used in the stylesheet further comprises generating an abstract machine instruction appropriate for processing the identified data type.

13. An apparatus for processing one or more XML documents where the processing includes a plurality of stylesheets using an abstract machine, the apparatus comprising:
   a processor;
   a memory coupled to the processor;
   means for reading a stylesheet of the plurality of stylesheets;
   means for parsing at least some Xpath expressions within the plurality of stylesheets into a respective tree of nodes;
   means for annotating the respective tree of nodes of the Xpath expressions with a data type of the Xpath expression;
   means for compiling the respective annotated tree of nodes of the Xpath expressions into a set of abstract machine instructions specialized for stylesheet processing, wherein the set of abstract machine instructions comprises a plurality of blocks of abstract machine instructions for the compiled stylesheet and includes a backtracking abstract machine instruction for each block of the plurality of blocks; and
   means for executing the instructions on an abstract machine to produce an output document, wherein the abstract machine uses a plurality of types of contiguous memory storage to match requirements of the stylesheet processing and wherein the plurality of types of contiguous memory storage includes a code stack, a heap stack and a transform allocator;
   means for resetting the code stack and the heap stack upon processing completing of each block of the plurality of blocks; and
   means for calling a block of the plurality of blocks via a pattern match for imports which calls a template that can match with a lower import precedence than a current template,
   wherein the executing the abstract machine instruction set in the abstract machine further comprises means for processing a representation of the one or more XML documents.

14. The apparatus of claim 13 wherein at least some of the set of abstract machine instructions further comprise abstract machine instructions for tree searches of the one or more XML documents.

15. The apparatus of claim 13 wherein at least some of the set of abstract machine instructions further comprise abstract machine instructions for storing and manipulating the results of tree searching the one or more XML documents.

16. The apparatus of claim 13 wherein the means for executing the instructions on the abstract machine instructions further comprises means for maintaining XSLT template invocation state using a memory stack.

17. The apparatus of claim 13 wherein the means for executing the instructions on the abstract machine instructions further comprises means for providing a transform allocator storage area for maintaining temporary data for processing.

18. The apparatus of claim 13 further comprising means for providing a memory stack for maintaining variable length data of the abstract machine.

19. The apparatus of claim 13 wherein the means for compiling the stylesheet further comprises means for identifying a type of each data value used in the stylesheet.

20. The apparatus of claim 19 wherein the means for identifying a type of each data value used in the stylesheet further comprises means for generating an abstract machine instruction appropriate for processing the identified data type.

* * * * *